(12) United States Patent
Kamikura

(10) Patent No.: US 11,125,991 B2
(45) Date of Patent: Sep. 21, 2021

(54) OPTICAL SCANNING DEVICE

(71) Applicant: CANON KABUSHIKI KAISHA, Tokyo (JP)

(72) Inventor: Takahiro Kamikura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 16/668,355

(22) Filed: Oct. 30, 2019

(65) Prior Publication Data
US 2020/0142186 A1 May 7, 2020

(30) Foreign Application Priority Data
Nov. 6, 2018 (JP) .............................. JP2018-208562

(51) Int. Cl.
| | |
|---|---|
| *G02B 26/12* | (2006.01) |
| *G03G 15/04* | (2006.01) |
| *G03G 15/043* | (2006.01) |

(52) U.S. Cl.
CPC ......... *G02B 26/121* (2013.01); *G03G 15/043* (2013.01); *G03G 15/04036* (2013.01)

(58) Field of Classification Search
CPC ........... G03G 15/04036; G03G 15/043; G02B 26/12; G02B 26/121
See application file for complete search history.

(56) References Cited

U.S. PATENT DOCUMENTS

| | | | | |
|---|---|---|---|---|
| 2007/0115527 A1* | 5/2007 | Lee | ...................... | G02B 26/121 359/200.1 |
| 2008/0260312 A1* | 10/2008 | Nishino | ............... | G02B 26/121 384/446 |
| 2011/0019253 A1* | 1/2011 | Oh | ........................ | G02B 26/121 359/200.7 |
| 2011/0116146 A1* | 5/2011 | Oh | ........................ | G02B 26/121 359/200.1 |
| 2015/0248077 A1* | 9/2015 | Hoshino | .......... | G03G 15/04036 399/216 |
| 2015/0309308 A1* | 10/2015 | Goto | ..................... | G02B 26/121 359/200.2 |
| 2016/0282524 A1* | 9/2016 | Hayakawa | ....... | G03G 15/04036 |
| 2017/0097450 A1* | 4/2017 | Hoshino | .......... | G03G 15/04036 |
| 2019/0322022 A1* | 10/2019 | Ohta | ..................... | G02B 26/12 |

FOREIGN PATENT DOCUMENTS

JP       2015-225199 A       12/2015

* cited by examiner

*Primary Examiner* — Sophia S Chen
(74) *Attorney, Agent, or Firm* — Venable LLP

(57) ABSTRACT

Disclosed is an optical scanning device, including: a motor (301) including a rotor (302) capable of rotating integrally with a shaft (305); a polygon mirror (308) including a through-hole (308*g*); a holding spring (309) configured to be engaged to the shaft (305) that is inserted into the through-hole (308*g*) and configured to press the polygon mirror (308) onto the rotor (302); and a restricting member (310) disposed in the through-hole (308*g*) of the polygon mirror (308), the restricting member (310) being configured to be in contact with the rotor (302) and the holding spring (309) and to restrict the holding spring (309) from moving toward a side of the rotor (302), wherein a linear expansion coefficient (A1) of the restricting member (310) is less than a linear expansion coefficient (B1) of the polygon mirror (308).

5 Claims, 12 Drawing Sheets

OPTICAL SCANNING DEVICE

BACKGROUND OF THE INVENTION

Field of the Invention

The present invention relates to an optical scanning device provided in an image forming apparatus.

Description of the Related Art

In an electro-photographic image forming apparatus, an optical scanning device is used forming an electrostatic latent image on a photosensitive drum, which scans a photosensitive drum via a scanning lens with a laser beam which has been light-modulated in accordance with an image signal and has been deflected by a polygon mirror.

Japanese Patent Laid-Open Application No. 2015-225199 describes an optical scanning device including a polygon mirror, a rotor that supports the polygon mirror and a motor having a spring that presses the polygon mirror against the rotor. In the optical scanning device described in Japanese Patent Laid-Open Application No. 2015-225199, the polygon mirror has a through-hole and a restricting member is disposed in the through-hole such that the restricting member is in contact with a rotor and a spring to restrict the spring from moving toward the rotor.

In recent years, for the purpose of cost reduction, a configuration is considered in which the polygon mirror and the restricting member are made of resin instead of conventional metal. However, the optical scanning device described in Japanese Patent Application Laid-Open No. 2015-225199 may cause a problem that the heat of the motor is transmitted from the rotor to the polygon mirror and the restricting member to deform them due to thermal expansion.

When the polygon mirror and the restricting member are deformed due to thermal expansion, the pressing force of the spring is changed, which may cause the axial displacement of the polygon mirror or the distortion of the reflecting surface of the polygon mirror. When such a change occurs, there is a possibility of causing density unevenness in the output image.

The present invention is made to solve the above-described problem, and an object of the present invention is to provide an optical scanning device that suppresses a change in position of the polygon mirror or distortion of the reflecting surface of the polygon mirror due to a temperature change.

SUMMARY OF THE INVENTION

In order to achieve the above object, a representative configuration of an optical scanning device according to the present invention includes: a motor including a rotor capable of rotating integrally with a rotating shaft; a polygon mirror including a through-hole; a spring configured to be engaged to the rotating shaft that is inserted into the through-hole and configured to press the polygon mirror onto the rotor; and a restricting member disposed in the through-hole of the polygon mirror, the restricting member being configured to be in contact with the rotor and the spring and to restrict the spring from moving toward a side of the rotor, wherein a linear expansion coefficient of the restricting member is less than a linear expansion coefficient of the polygon mirror.

Further features of the present invention will become apparent from the following description of exemplary embodiments with reference to the attached drawings.

DESCRIPTION OF THE EMBODIMENTS

An embodiment of the optical scanning device according to the present invention will be specifically described with reference to the drawings.

First Embodiment

First, the configuration of the first embodiment of the optical scanning device according to the present invention will be described with reference to FIGS. 1 to 5.

Figure 1:
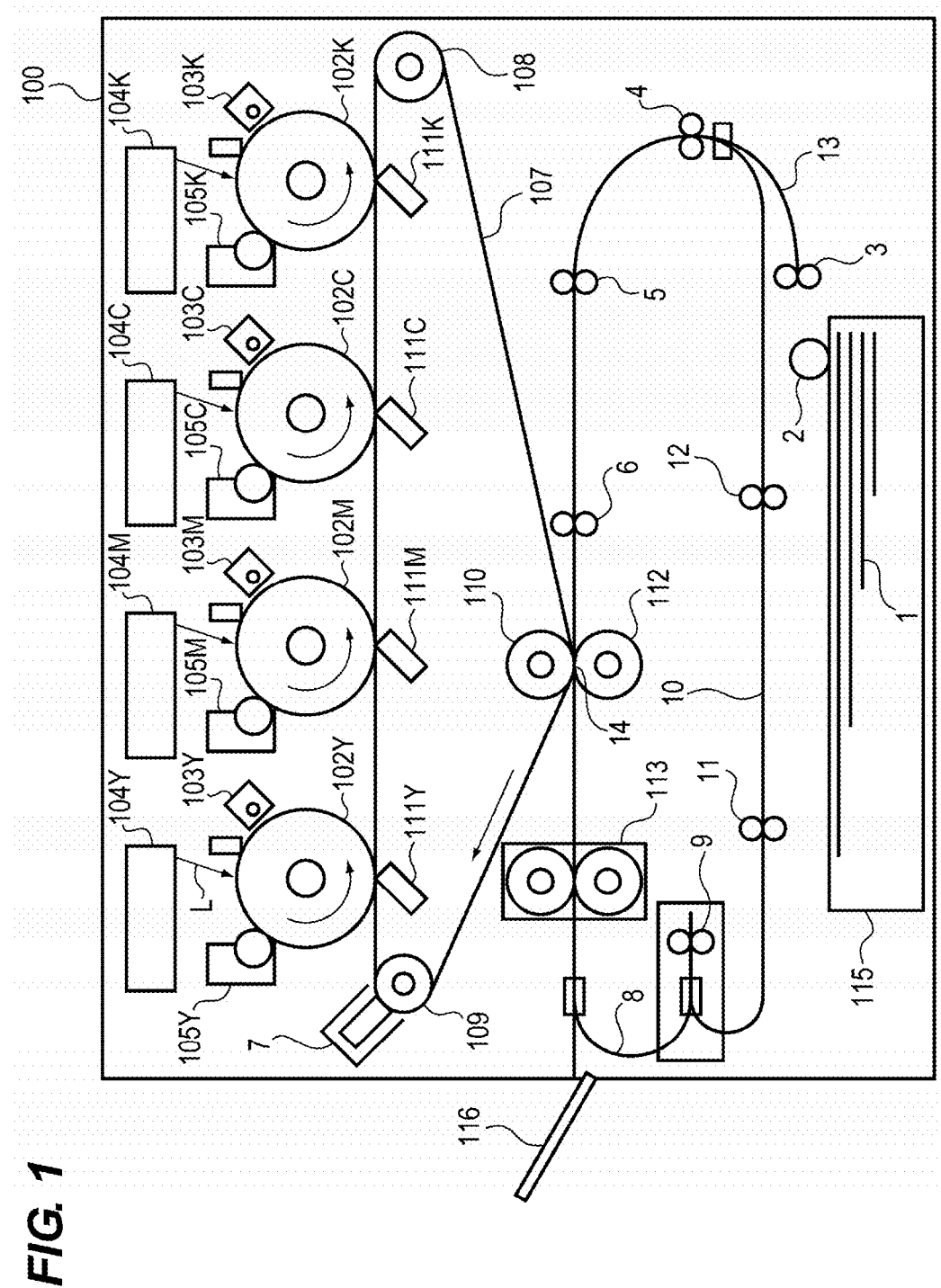
FIG. 1 is a cross-sectional view showing a configuration of an image forming apparatus.

<Image forming apparatus> The configuration of the image forming apparatus 100 will be described with reference to FIG. 1. FIG. 1 is a cross-sectional view showing the configuration of the image forming apparatus 100. The image forming apparatus 100 shown in FIG. 1 forms a multicolor image using a plurality of colors of toner (developer). The image forming apparatus 100 can be applied to an image forming apparatus for a single color image.

The image forming apparatus 100 may be, for example, any of a printing apparatus, a printer, a copying machine, a multifunctional printer (IMEP) and a facsimile apparatus. The suffixes Y, M, C, and K of the reference numerals indicate that the colors of the toners used by the corresponding members are yellow Y, magenta M, cyan C and black K, respectively. In the following description, the suffixes Y, M, C and K may be omitted when it is not necessary to distinguish the colors. The image forming apparatus 100 includes four image forming stations as image forming portions that form toner images using toners as developers of yellow Y, magenta M, cyan C and black K, respectively.

The image forming units corresponding to the colors include the photosensitive drums 102Y, 102M, 102C and 102K as image bearing members, respectively. Around the photosensitive drums 102Y, 102M, 102C and 102K, the charging portions 103Y, 103M, 103C and 103K as charging devices, the optical scanning devices 104Y, 104M, 104C and 104K, and the developing units 105Y, 105M, 105C and 105K as developing devices are disposed, respectively. Around the photosensitive drums 102Y, 102M, 102C and 102K, cleaning portions (not shown) are further arranged respectively as cleaning devices.

The intermediate transfer belt 107 made of an endless belt as an intermediate transfer member is arranged below the photosensitive drums 102Y, 102M, 102C and 102K. The intermediate transfer belt 107 is stretched around the driving roller 108 and the driven rollers 109 and 110.

During the image formation, the outer circumferential surface of the intermediate transfer belt 107 moves in the clockwise direction in FIG. 1 as the driving roller 108 rotates. At the positions opposed to the photosensitive drums 102Y, 102M, 102C and 102K via the intermediate transfer belt 107, the primary transfer bias blades 111Y, 111M, 111C and 111K as primary transfer devices are respectively disposed.

The image forming apparatus 100 includes the secondary transfer bias roller 112 as a secondary transfer device for transferring a toner image formed on the outer circumferential surface of the intermediate transfer belt 107 onto the recording material 1 such as a sheet of paper. The image forming apparatus 100 further includes the fixing unit 113 as a fixing device for fixing the toner image transferred onto the recording material 1 to the recording material 1.

Next, an image forming operation from the charging process to the developing process in the image forming apparatus 100 will be described. The image forming operation performed in the image forming portion corresponding to each color is the same as those of the other colors. Therefore, hereinafter, the image forming operation in the image forming portion corresponding to the color yellow Y will be described as an example and a duplicate description is omitted for the image forming in the image forming portions corresponding to the colors magenta M, cyan C and black K.

Figure 2:
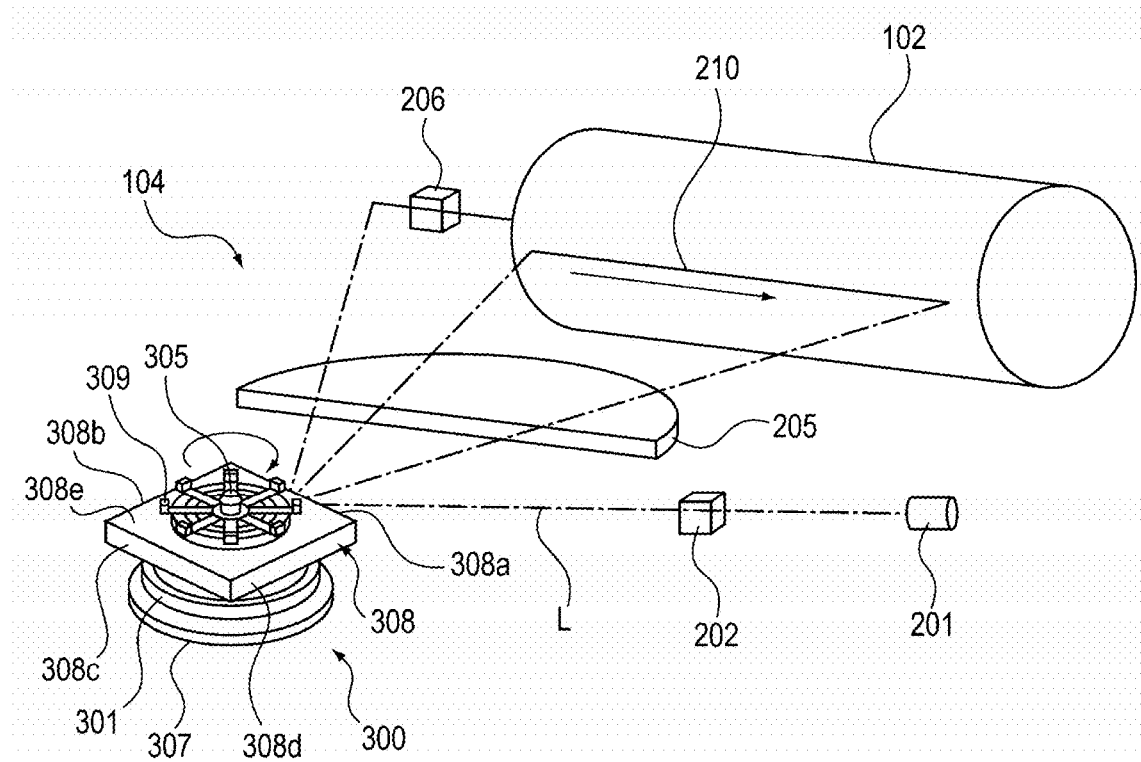
FIG. 2 is a perspective view showing a configuration of an optical scanning device.

First, the charging portion 103Y of the image forming portion corresponding to the color yellow Y uniformly charges the surface of the photosensitive drum 102Y that is driven to rotate in the counterclockwise direction in FIG. 1. The optical scanning device 104Y emits a plurality of laser beams L and scans the uniformly charged surface of the photosensitive drum 102Y with the plurality of laser beams L to expose the surface of the photosensitive drum 102Y. As a result, the electrostatic latent image 210 shown in FIG. 2 is formed on the surface of the photosensitive drum 102Y that rotates in the counterclockwise direction in FIG. 1.

The electrostatic latent image 210 formed on the surface of the photosensitive drum 102Y is developed as a toner image of color yellow Y by the developing portion 105Y. As a result, a toner image of the color yellow Y is formed on the surface of the photosensitive drum 102Y. Further, in the image forming portions corresponding respectively to the color magenta M, the color cyan C and the color black K, toner images of the color magenta M, the color cyan C and the color black K are respectively formed on the photosensitive drums 102M, 102C and 102K in the same process as the image forming portion corresponding to the color yellow Y.

Hereinafter, the image forming operation of the transfer process and the image forming operation after the transfer process will be described. In the transfer process, first, the primary transfer bias blades 111Y, 111M, 111C and 111K respectively apply a transfer bias to the intermediate transfer belt 107. As a result, toner images of four colors of yellow Y, magenta M, cyan C, and black K respectively formed on the surface of the photosensitive drums 102 are primarily transferred and superimposed on the outer circumferential surface of the intermediate transfer belt 107.

A toner image with four toner colors formed and superimposed on the outer circumferential surface of the intermediate transfer belt 107 is transferred to the secondary transfer nip portion 14 between the secondary transfer bias roller 112 and the outer circumferential surface of the intermediate transfer belt 107 as the outer circumferential surface of the intermediate transfer belt 107 moves.

On the other hand, the recording materials 1 accommodated in the feeding cassette 115 are fed out by the feeding roller 2, and separated and fed one by one in cooperation with a separation mechanism (not shown). Thereafter, the leading end of the recording material 1 conveyed by the conveying rollers 3 to 5 abuts against the nip portion of the registration roller 6 that has been stopped so that the skew of the recording material 1 is corrected. The recording material 1 is conveyed to the secondary transfer nip portion 14 by the registration roller 6 in accordance with the timing at which the toner image formed on the outer circumferential surface of the intermediate transfer belt 107 is conveyed to the secondary transfer nip portion 14.

A secondary transfer bias is applied to the secondary transfer bias roller 112 from a secondary transfer power source (not shown) so that the toner image born on the outer circumferential surface of the intermediate transfer belt 107 in the secondary transfer nip portion 14 is secondarily transferred onto the recording material 1. Residual toner remaining on the outer circumferential surface of the intermediate transfer belt 107 after the secondary transfer is removed by the cleaner 7 as a cleaning device.

The toner image formed on the recording material 1 is fixed to the recording material 1 by being heated and pressed while being nipped and conveyed by a heating roller and a pressing roller provided at the fixing portion 113. The recording material 1 to which the toner image is fixed is discharged to the discharge portion 116. When a series of processes for forming an image is completed in this way, image forming operation for the next recording material 1 is started continuously.

When printing is to be performed on both sides of the recording material 1, the recording material 1 that has passed through the fixing unit 113 is guided to the reversing path 8 where the recording material 1 is reversed, and thereafter the recording material 1 is placed on the double-side path 10 by the reversing roller 9. The recording material 1 conveyed by the conveying rollers 11 and 12 provided at the double-side path 10 joins the conveying path 13 and printing is performed on the second side in the same manner as the printing on the first side described above. Thereafter, the recording material 1 is discharged to the discharge portion 116.

Figure 3:
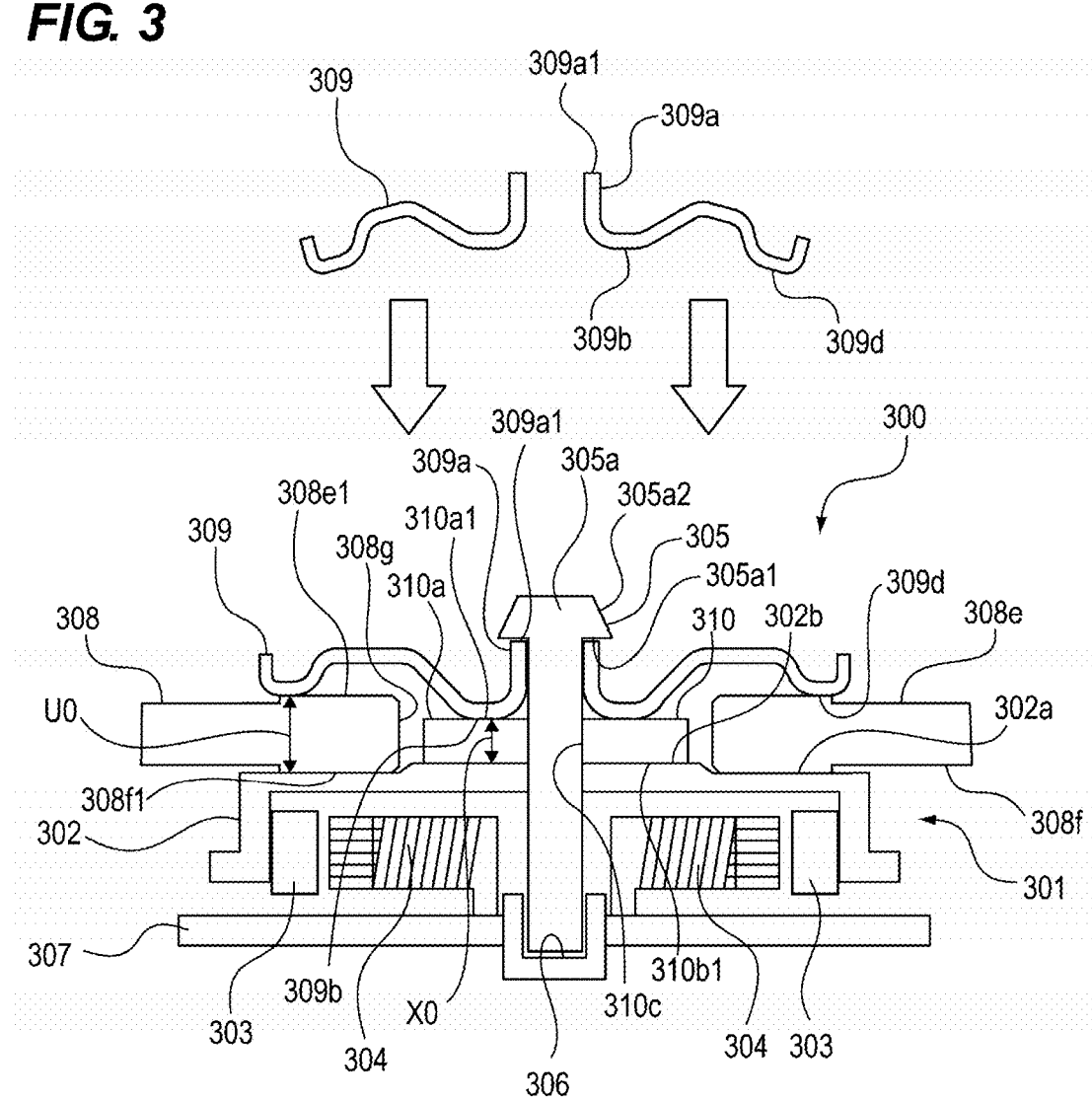
FIG. 3 is a cross-sectional view showing a configuration of a polygon motor unit of the first embodiment.

<Optical scanning device> Next, the configuration of the optical scanning device 104 will be described with reference to FIGS. 2 and 3. FIG. 2 is a perspective view showing the configuration of the optical scanning device 104. FIG. 3 is a cross-sectional view showing the configuration of the polygon motor unit 300 of the present embodiment. The optical scanning device 104 shown in FIG. 2 includes the light source 201, the collimator lens 202, the polygon motor unit 300, the polygon mirror 308 as a rotary polygon mirror, the motor 301 and the fθ lens 205 as a scanning lens.

Here, the fθ lens 205 has a lens characteristic (fθ characteristic) that when the laser beam L enters at the angle θ, an image having a size (f×θ) obtained by multiplying the angle θ by the focal length f of the fθ lens 205 is formed. The optical scanning device 104 further includes a BD (Beam Detect) sensor 206 that detects the laser beam L, and the like.

As shown in FIG. 3, the polygon motor unit 300 includes the polygon mirror 308 and the motor 301. The motor 301 has the rotor 302 that can rotate integrally with the shaft 305 as a rotating shaft. The motor 301 drives the polygon mirror 308 to rotate. The polygon mirror 308 is a rotating polygon mirror and has a plurality of reflecting surfaces 308a to 308d that are mirror surfaces as deflection surfaces along the axial direction of the shaft 305 shown in FIG. 3 (vertical direction in FIG. 3).

The circular through-hole 308g is provided at the center of the polygon mirror 308. As shown in FIG. 2, the polygon mirror 308 is formed as a hexahedron composed of the upper reflecting surface 308e, the lower reflecting surface 308f, and the reflecting surfaces 308a to 308d as four side surfaces. The upper reflecting surface 308e and the lower reflecting surface 308f are square and the reflecting surfaces 308a to 308d are rectangular. One reflecting surface or reflecting surfaces other than four may be provided instead of the four reflecting surfaces 308a to 308d.

The laser beam L emitted from the light source 201 is deflected according to the rotation of the polygon mirror 308 that rotates in the clockwise direction in FIG. 2 around the shaft 305 as a rotational center. At this time, the laser beam L that is incident on and is deflected by the reflecting surface 308a, the reflecting surface 308b, the reflecting surface 308c and the reflecting surface 308d in this order when the reflecting surface 308a is taken as a starting point.

The light source 201 emits the laser beam L to expose the surface of the photosensitive drum 102. The polygon mirror 308 is an example of a rotating polygon mirror that deflects the laser beam L on any one of the plurality of reflecting surfaces 308a to 308d while rotating so that the laser beam L scans the surface of the photosensitive drum 102. The light source 201 is driven by a driving current supplied from a laser driver (not shown). The light source 201 emits light when supplied with a driving current from a laser driver (not shown), and emits the laser beam L having a light amount corresponding to the driving current.

The light source 201 generally includes n (n is a natural number) laser diodes LD as light-emitting elements (light-emitting points). In the optical scanning device 104 of the present embodiment, n is an integer of 2 or more, and a multi-beam method is used in which the surface of the photosensitive drum 102 is scanned with a plurality of laser beams L emitted from a plurality of laser diodes LD. In the following description, the light source 201 includes two laser diodes LD1 and LD2 (n=2) as an example.

The collimator lens 202 changes the laser beam L emitted from the light source 201 into parallel light. The laser beam L that has passed through the collimator lens 202 is incident on any one of the reflecting surfaces 308a to 308d included in the polygon mirror 308 and is reflected by the incident reflecting surface.

The polygon mirror 308 is driven by the motor 301 so as to rotate in the clockwise direction in FIG. 2. The polygon mirror 308 is driven to rotate at a constant speed (constant angular speed) while the laser beam L scans the surface of the photosensitive drum 102 in order to form the electrostatic latent image 210 on the surface of the uniformly charged photosensitive drum 102. The polygon mirror 308 reflects the laser beam L on each of the reflecting surfaces 308a to 308d while rotating so that the incident laser beam L is deflected at continuous angles.

The laser beam L deflected by the polygon mirror 308 is incident on the fθ lens 205. The laser beam L passes through the fθ lens 205 to form a beam spot on the surface of the photosensitive drum 102 and scans the photosensitive drum 102 at a constant speed in the main scanning direction. As a result, an electrostatic latent image 210 is formed on the surface of the photosensitive drum 102. Here, the main scanning direction is a direction parallel to the surface of the photosensitive drum 102 and orthogonal to the moving direction of the surface of the photosensitive drum 102. The sub-scanning direction is the moving direction of the surface of the photosensitive drum 102 (the direction orthogonal to the main scanning direction).

In the optical scanning device 104, the BD sensor 206 is disposed at a position on the scanning start side of the laser beam L in the scanning path of the laser beam L that has passed through the fθ lens 205. The BD sensor 206 is used as an optical sensor for detecting the laser beam L. When the laser beam L is incident on the BD sensor 206 for each scanning period of the laser beam L, the BD sensor 206 generates and outputs a BD signal as a detection signal indicating that the laser beam L has been detected.

The BD signal output from the BD sensor 206 is used as a synchronization signal serving as a reference for image writing timing in the main scanning direction. The light source 201 is controlled to forcibly emit the laser beam L during a certain period for the laser beam L to be incident on the BD sensor 206 in order to output a BD signal from the BD sensor 206 for each scanning period of the laser beam L.

<Polygon motor unit> Next, the configuration of the polygon motor unit 300 of this embodiment will be described with reference to FIG. 3. The polygon motor unit 300 shown in FIG. 3 includes the motor 301, the polygon mirror 308, the holding spring 309, and the restricting member 310. The holding spring 309 is provided with the cylindrical portion 309a that is engaged to the shaft 305 serving as a rotational shaft inserted into the through-hole 308g of the polygon mirror 308.

The upper-end portion 309a1 of the cylindrical portion 309a of the holding spring 309 abuts against the bottom surface 305a1 of the head portion 305a of the shaft 305. As a result, the pressing portion 309d presses the pressed portion 308e1 onto the upper surface 308e of the polygon mirror 308 by the elastic force of the holding spring 309, and presses the abutting portion 308f1 on the lower surface 308f of the polygon mirror 308 onto the abutted portion 302a on the upper surface of the rotor 302.

The motor 301 includes the rotor 302, the rotary magnet 303, the shaft 305, the bearing 306, the excitation coil 304 and the circuit board 307. The rotor 302 is integrally provided with the rotary magnet 303 and the shaft 305. The rotary magnet 303 has S poles and N poles that are alternately magnetized and is fixed to the inner circumferential surface of the rotor 302. The shaft 305 is rotatably supported by the bearing 306. The bearing 306 may be realized by a ball bearing as a rolling bearing, a metal bearing as a sliding bearing, a dynamic pressure bearing as a fluid bearing or the like.

A plurality of energizing coils 304 are provided at positions facing the rotary magnet 303 on the circuit board 307. The bearing 306 and the energizing coils 304 are supported on the circuit board 307. Further, in order to keep the pressing force applied from the holding spring 309 to the polygon mirror 308 within a predetermined range, a ring-shaped restricting member 310 is placed in the circular through-hole 308g provided at the center of the polygon mirror 308. The restricting member 310 comes into contact with the abutted portion 302b on the upper surface of the rotor 302 and the pressing portion 309b of the holding spring 309 and restricts the movement of the holding spring 309 toward the rotor 302 (rotor side).

Figure 4:
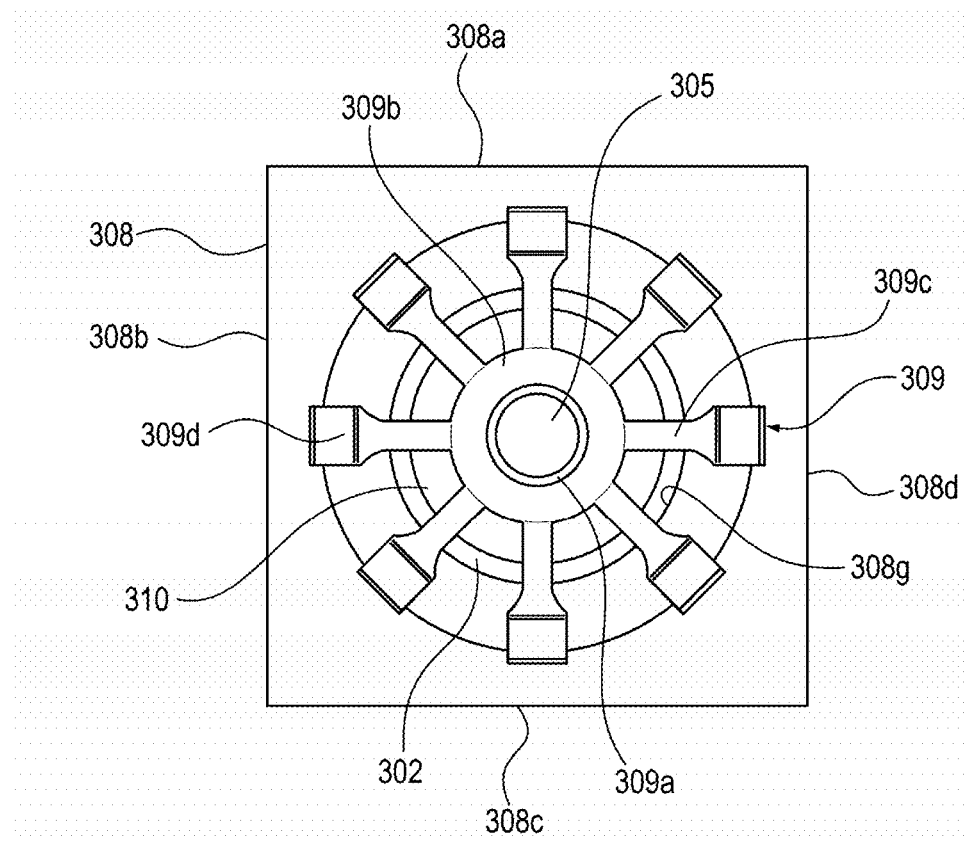
FIG. 4 is a plan view showing the configuration of the polygon motor unit of the first embodiment.

The shaft 305 is slidably inserted into the circular through-hole 310c provided at the central portion of the restricting member 310. The cylindrical portion 309a is provided at the center of the holding spring 309 and the shaft 305 is slidably inserted into the cylindrical portion 309a. The ring-shaped pressing portion 309b shown in FIG. 4 is provided continuously to the cylindrical portion 309a. The pressing portion 309b presses the restricting member 310 toward the rotor 302 by the elastic force of the holding spring 309.

The eight arm portions 309c are provided in the radial directions continuously to the ring-shaped pressing portion 309b. The square-shaped pressing portions 309d are provided continuously to the arm portions 309c, respectively. The pressing portions 309d press the polygon mirror 308 toward the rotor 302 by the elastic force of the holding spring 309. The restricting member 310 restricts the holding spring 309 from moving toward the rotor 302.

When the cylindrical portion 309a of the holding spring 309 is pressed from above in the direction of the arrow along the inclined surface 305a2 of the head portion 305a of the shaft 305 shown in FIG. 3, the elastic cylindrical portion 309a is elastically deformed and expands to open so that the elastic cylindrical portion 309a passes through the head portion 305a and is engaged to the shaft 305. The cylindrical portion 309a engaged to the shaft 305 is elastically deformed and contracts so that the upper-end portion 309a1 of the cylindrical portion 309a abuts against the bottom surface 305a1 of the head portion 305a of the shaft 305. As a result, the holding spring 309 is restricted from moving toward the opposite side of the rotor 302.

Next, the configuration in which the polygon mirror 308 is pressed by the holding spring 309 will be described with reference to FIG. 4. FIG. 4 is a plan view showing the configuration of the polygon motor unit 300 of the present embodiment. As shown in FIG. 4, the holding spring 309 has arm portions 309c. The arm portions 309c respectively connect the ring-shaped pressing portion 309b that abuts against the upper surface 310a of the restricting member 310 and the square-shaped pressing portions 309d that abut against the pressed portion 308e1 of the upper surface 308e of the polygon mirror 308. The width of the arm portions 309c is less than the width of the pressing portions 309d.

As shown in FIG. 3, the holding spring 309 is assembled to the polygon motor unit 300. The holding spring 309 is elastically deformed around the arm portions 309c. The pressing portion 309d of the holding spring 309 presses the pressed portion 308e1 of the upper surface 308e of the polygon mirror 308 by the stress when the arm portions 309c are elastically deformed. As a result, the polygon mirror 308 is pressed against the rotor 302. When the motor 301 is driven to rotate, the rotor 302, the polygon mirror 308, the restricting member 310, the holding spring 309 and the shaft 305 rotate integrally around the shaft 305 as a rotation center.

Comparative Example

Figure 11A:
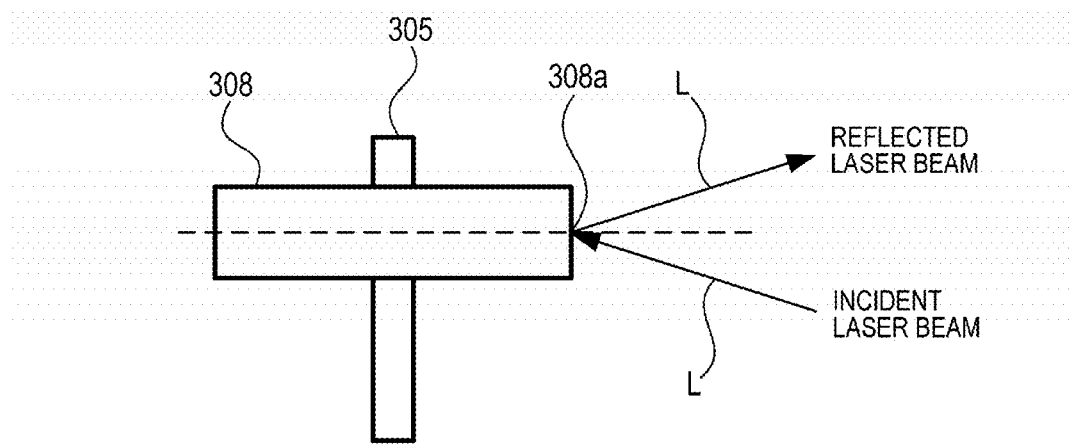
FIG. 11A is a view showing an optical path of a laser beam in a state where the reflecting surface of the polygon mirror is not deformed.
Figure 11B:
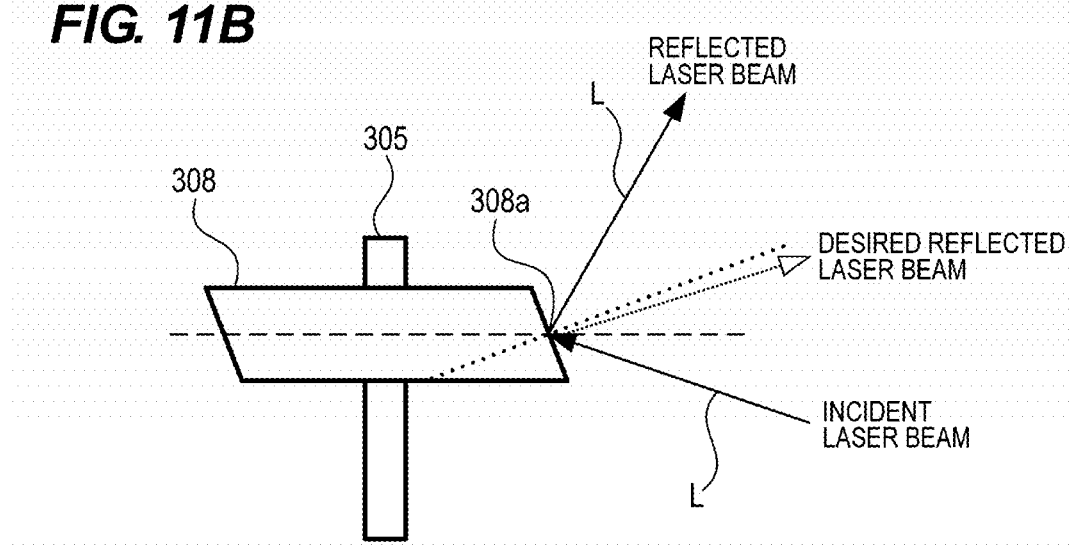
FIG. 11B is a view showing an optical path of the laser beam in a state where the reflecting surface of the polygon mirror is deformed.

Here, the influence on the optical path by the reflection position of the laser beam L incident on the reflecting surface 308a of the polygon mirror 308 will be described with reference to FIGS. 11A and 11B. In FIGS. 11A and 11B, only the polygon mirror 308 and the shaft 305 that serves as the rotation center of the polygon mirror 308 are simply shown to schematically illustrate the optical path.

FIG. 11A shows the state where the laser beam L is incident and reflected at the desired position with the desired angle on the reflecting surface 308a of the polygon mirror 308 arranged parallel to the axial direction of the shaft 305 that is the rotation center of the polygon mirror 308. With the laser beam L reflected by the reflecting surface 308a, the laser beam L passes through the optical path indicated by FIG. 11A so that the laser beam L is correctly incident on the photosensitive drum (not shown) in the sub-scanning direction of the photosensitive drum. As a result, an image is formed without density unevenness.

On the other hand, FIG. 11B shows the state where the reflecting surface 308a of the polygon mirror 308 is inclined at a predetermined angle with respect to the axial direction of the shaft 305 that is the rotation center of the polygon mirror 308. Due to the fact that the reflecting surface 308a of the polygon mirror 308 is inclined with respect to the axial direction of the shaft 305, the incident angle and the incident position of the laser beam L with respect to the reflecting surface 308a of the polygon mirror 308 change. The polygon mirror 308 has a plurality of reflecting surfaces and the inclination angles of the reflecting surfaces with respect to the axis direction of the shaft 305 respectively have different variations. For this reason, when the sub-scanning is performed, the density in the positions of the laser beam L incident on the photosensitive drum varies so that density unevenness occurs in the sub-scanning direction.

FIG. 11B shows that the reflecting surfaces of the polygon mirror 308 have different inclination angles with respect to the axial direction of the shaft 305. As shown in the comparative example of FIG. 12, when the pressing force of the holding spring 309 that presses the polygon mirror 308 against the rotor 302 changes, the positions of the reflecting surfaces change due to the displacement of the polygon mirror 308. In this case, the positions of the laser beam incident on reflecting surfaces of the polygon mirror 308 respectively vary in the sub-scanning direction of the photosensitive drum. As a result, density unevenness occurs in the sub-scanning direction.

Figure 12:
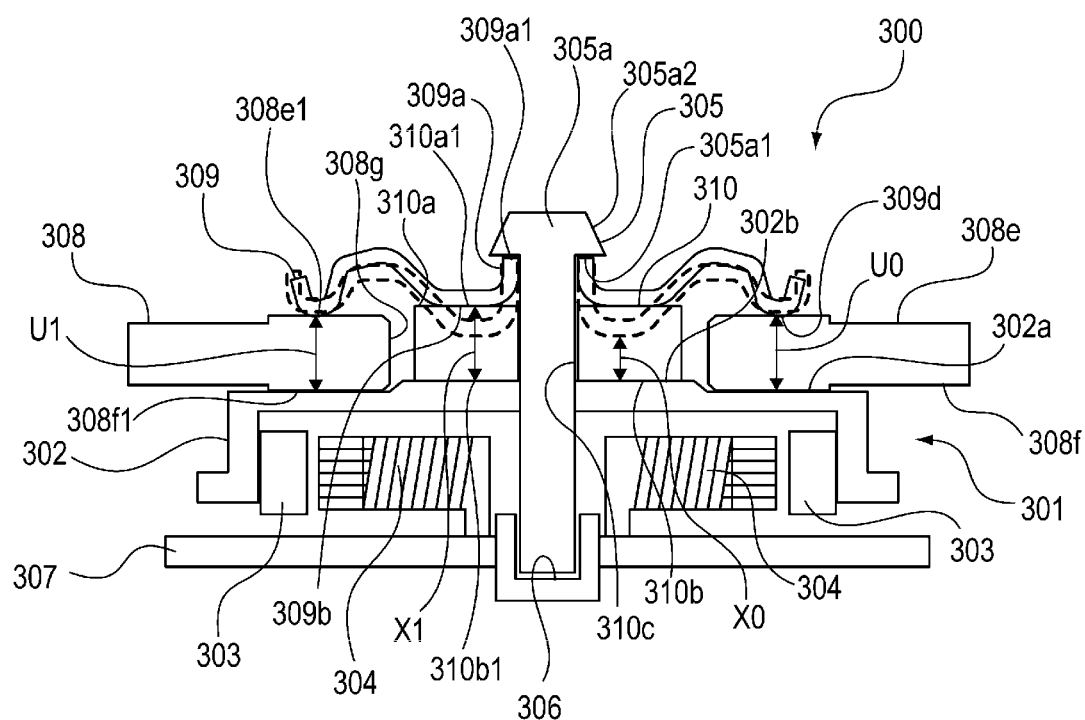
FIG. 12 is a view for explaining a problem in a polygon motor unit as a comparative example.

In the comparative example shown in FIG. 12, the polygon mirror 308 and the restricting member 310 that are pressed against the rotor 302 by the holding spring 309 are thermally deformed in accordance with their inherent linear expansion coefficients. The length and volume of the material expand with increasing temperature. The linear expansion coefficient represents the ratio of the increase in the length of material to the original length when the temperature rises by 1° C. A problem will be described with reference to FIG. 12 that the pressing force of the holding spring 309 changes due to the difference between the linear expansion coefficients A and B of the restricting member 310 and the polygon mirror 308, thereby causing an image defect.

Due to the difference between the linear expansion coefficients A and B of the restricting member 310 and the polygon mirror 308 that are pressed against the rotor 302 by the holding spring 309, the pressing force of the holding spring 309 changes, thereby causing an image defect. FIG. 12 is a cross-sectional view showing the configuration of the polygon motor unit 300 for explaining the problem of the comparative example. The restricting member 310 shown in FIG. 12 is made from paper Bakelite and its linear expansion coefficient A0 is 160 (×10$^{-6}$/° C.). On the other hand, the material of the polygon mirror 308 is polycarbonate (PC), and its linear expansion coefficient B0 is 65 (×10$^{-6}$/° C.).

The case is considered where the motor 301 is stopped at the environmental temperature of 25° C., which is normal temperature, at the place where the polygon motor unit 300 is placed. Here, the normal temperature is a normal environmental temperature in a factory where the assembly operation of the polygon motor unit 300 is performed and means about 25° C.±5° C. At this time, the thickness U0 of the polygon mirror 308 is 10 mm. For the thickness U0 of the polygon mirror 308, the pressed portion 308e1 of the polygon mirror 308 that is pressed by the holding spring 309 is considered.

Further, the abutting portion 308f1 provided on the lower surface 308f of the polygon mirror 308 that is in contact with the upper surface of the rotor 302 is considered. The thickness U0 from the pressed portion 308e1 to the abutting portion 308f1 of the polygon mirror 308 in the axial direction of the shaft 305 (the vertical direction in FIG. 12) is the thickness of the polygon mirror 308.

The case is considered where the motor 301 is stopped at the environmental temperature of 25° C., which is normal temperature, at the place where the polygon motor unit 300 is placed. At this time, the thickness X0 of the restricting member 310 from the pressed portion 310a1 of the restricting member 310 that is pressed by the holding spring 309 to the lower surface 310b of the restricting member 310 that is in contact with the upper surface of the rotor 302 in the axial direction of the shaft 305 (vertical direction in FIG. 12) is 8 mm.

Next, the state where the heat of the motor 301 is transmitted to the polygon mirror 308 and to the restricting member 310 through the rotor 302 after the polygon motor unit 300 starts to operate will be described. The heat is generated from the parts of the motor 301 when the motor 301 rotates about the shaft 305 as a rotation center. The heat is generated through a copper loss and an iron loss occurring when an electric current starts to flow through the exciting coil 304 attached to the circuit board 307. Further, the shaft 305 is rotatably supported by the bearing 306 provided on the circuit board 307 and the heat is also generated due to friction between the rotating shaft 305 and the bearing 306. This heat is transmitted to the polygon mirror 308 and the restricting member 310 via the rotor 302.

In such a configuration, the influence when the rotation of the motor 301 continues and the temperature of the polygon mirror 308 and the restricting member 310 exceeds the normal temperature and reaches 80° C. is considered. For example, the case is considered where the assembly process of the polygon motor unit 300 is performed at 25° C. as normal temperature and the temperature of the motor rises from 25° C. as normal temperature to 80° C. due to the heat generated by the rotation of the motor 301. At this time, the parts of the polygon motor unit 300 thermally expand under the influence of the temperature change ΔT calculated by the following Equation 1.

$$\Delta T = 80° C. - 25° C. = 55° C. \quad \text{[Equation 1]}$$

The thickness U1 of the polygon mirror 308 that changes due to the temperature change ΔT in Equation 1 is calculated by the following Equation 2. At this time, the pressed portion 308e1 of the polygon mirror 308 pressed by the holding spring 309 is considered for the thickness U1 of the polygon mirror 308. Further, the abutting portion 308f1 provided on the lower surface 308f of the polygon mirror 308 that is in contact with the abutting portion 302a on the upper surface of the rotor 302 is considered. The thickness U1 of the polygon mirror 308 is from the pressed portion 308e1 to the abutting portion 308f1 in the axial direction of the shaft 305 (vertical direction in FIG. 12).

Here, it is assumed that the thickness U0 of the polygon mirror 308 at 25° C. as normal temperature is 10 mm and the temperature change ΔT of the polygon mirror 308 is 55° C. (=80° C.-25° C.). Further, the linear expansion coefficient B0 of polycarbonate (PC) which is the material of the polygon mirror 308 is set to 65 (×10$^6$/° C.).

$$U1 = U0 + U0 \times \Delta T \times B0 \quad \text{[Equation 2]}$$
$$= 10 \text{ mm} + (10 \text{ mm} \times 55° C. \times 65 \times 10^{-6}/° C.)$$
$$= 10.03575 \text{ mm}$$

Further, the thickness X1 of the restricting member 310 from the pressed portion 310a1 of the restricting member 310 pressed by the holding spring 309 to the lower surface 310b that is in contact with the abutted portion 302b on the upper surface of the rotor 302 under influence of the temperature change ΔT in the Equation 1 is calculated by the following Equation 3. Here, it is assumed that the thickness X0 of the restricting member 310 at 25° C. as normal temperature is 8 mm, the temperature change ΔT of the restricting member 310 is 55° C. (=80° C.-25° C.) and the linear expansion coefficient A0 of the paper bakelite that is the material of the restricting member 310 is set to 160 (×10$^6$/° C.).

$$X1 = X0 + (X0 \times \Delta T \times A0) \quad \text{[Equation 3]}$$
$$= 8 \text{ mm} + (8 \text{ mm} \times 55° C. \times 160 \times 10^{-6}/° C.)$$
$$= 8.0704 \text{ mm}$$

At this time, the polygon mirror 308 thermally expands by 35.75 μm in the axial direction of the shaft 305 (the vertical direction in FIG. 12), and the restricting member 310 thermally expands by 70.4 μm in the axial direction of the shaft 305 (the vertical direction in FIG. 12).

<Change in spring pressure due to thermal expansion>
Next, a change in the spring pressure of the holding spring 309 due to the thermal expansion and its influence will be described. The dotted line in FIG. 12 indicates the holding spring 309 at 25° C. as normal temperature. On the other hand, the solid line in FIG. 12 indicates the holding spring 309 under the influence of thermal expansion caused by the temperature increase of the motor 301 to 80° C. due to the heat generation of the motor 301 when the motor 301 rotates.

The cylindrical portion 309a of the holding spring 309 is engaged so as to be movable along the outer circumference of the shaft 305, and the upper-end portion 309a1 of the cylindrical portion 309a of the holding spring 309 abuts against the bottom surface 305a1 of the head portion 305a of the shaft 305 so that the upward movement of the holding spring 309 is restricted. The outer diameter of the bottom surface 305a1 of the head portion 305a is set larger than the outer diameter of the shaft 305.

As shown in FIG. 4, the holding spring 309 is provided with arm portions 309c. These arm portions 309c are elastically deformed. The arm portions 309c respectively connect the ring-shaped pressing portion 309b that presses the pressed portion 310a1 of the restricting member 310 with the square-shaped pressing portions 309d that press the pressed portion 308e1 of the polygon mirror 308. The width of the arm portions 309c is less than the width of the pressing portions 309d.

The holding spring 309 presses the polygon mirror 308 against the rotor 302 at the pressing portions 309d so that the polygon mirror 308 is fixed by the deformation stress of the arm portions 309c. As shown in Equation 2, when the temperature of the polygon mirror 308 rises from 25° C. as normal temperature to 80° C., the polygon mirror 308 thermally expands, so that the thickness of the polygon mirror 308 increases by 35.75 µm. Further, when the temperature of the restricting member 310 rises from 25° C. as normal temperature to 80° C., the restricting member 310 thermally expands, so that the thickness of the restricting member 310 increases by 70.4 µm.

Therefore, the pressing portion 309b of the holding spring 309 is pressed upwardly in FIG. 12 by 70.4 µm along the axial direction of the shaft 305 due to thermal expansion of the restricting member 310. On the other hand, the pressing portion 309d of the holding spring 309 is pressed upwardly in FIG. 12 by 35.75 µm along the axial direction of the shaft 305 due to thermal expansion of the polygon mirror 308. Accordingly, the holding spring 309 at 25° C. as normal temperature as shown in the dotted line in FIG. 12 is deformed as shown in the solid line in FIG. 12 when the temperature rises from 25° C. to 80° C. due to the thermal expansion of the polygon mirror 308 and the restricting member 310.

The deformation of the pressing portion 309b of the holding spring 309 that presses the pressed portion 310a1 of the restricting member 310 is such that the radius of curvature R of the pressing portion 309b indicated by the dotted line in FIG. 12 is less than the radius of curvature R of the pressing portion 309b indicated by the solid line in FIG. 12. Therefore, the pressing force of the pressing portion 309d of the holding spring 309 for pressing the pressed portion 308e1 of the polygon mirror 308 as shown by the solid line in FIG. 12 is less than that indicated by the dotted line in FIG. 12. As a result, the polygon mirror 308 is displaced in the axial direction of the shaft 305 with respect to the rotor 302 due to the temperature change ΔT of the motor 301.

The restricting member 310 is provided in order to manage the pressing force of the holding spring 309 that presses the polygon mirror 308. For this reason, when the material of the restricting member 310 with an inappropriate linear expansion coefficient A is selected, the function of the restricting member 310 for managing the pressing force of the holding spring 309 that presses the polygon mirror 308 is impaired. As a result, the polygon mirror 308 may be displaced in the axial direction of the shaft 305, causing density unevenness in the sub-scanning direction.

<Selection range of linear expansion coefficient of restricting member> Next, the configuration in which the linear expansion coefficient A1 of the restricting member 310 is selected within a predetermined range based on the linear expansion coefficient B1 of the polygon mirror 308 will be described. In the present embodiment, the linear expansion coefficient A1 of the restricting member 310 is set to half or less than the linear expansion coefficient B1 of the polygon mirror 308. That is, the linear expansion coefficient A1 of the restricting member 310 is less than the linear expansion coefficient B1 of the polygon mirror 308. As a result, the restricting member 310 can be selected so that the position of the polygon mirror 308 pressed against the rotor 302 by the holding spring 309 is not shifted. Here, the materials of the polygon mirror 308 and the restricting member 310 are selected in such a range that the linear expansion coefficient B1 of the polygon mirror 308 and the linear expansion coefficient A1 of the restricting member 310 are in the relationship represented by the following Equation 4.

$$A1 \leq 0.5 \times B1 \quad [\text{Equation 4}]$$

Figure 5:
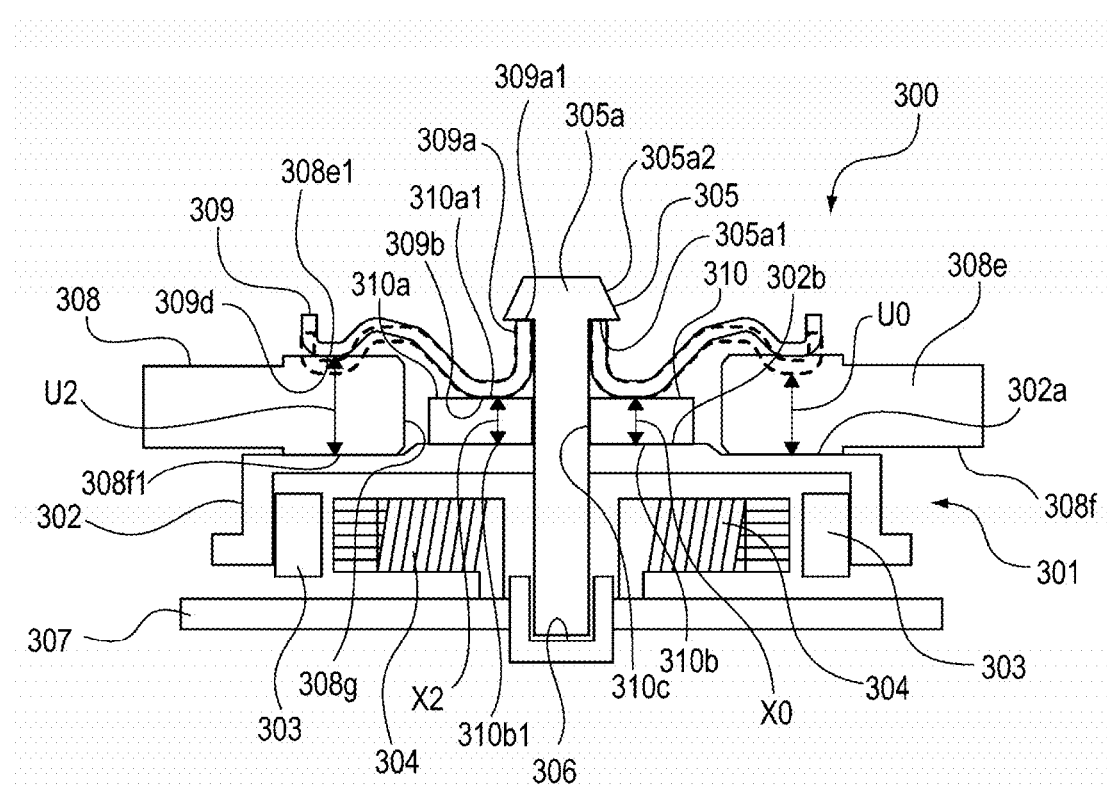
FIG. 5 is a cross-sectional view showing a configuration of a polygon motor unit of the first embodiment.

<Problem in Selecting Linear Expansion Coefficient of Restricting Member> Next, the problem in selecting the linear expansion coefficient A1 of the restricting member 310 will be described with reference to FIG. 5. FIG. 5 is a cross-sectional view showing the configuration of the polygon motor unit 300 of this embodiment. The material of the polygon mirror 308 shown in FIG. 5 is polycarbonate (PC), and its linear expansion coefficient B1 is 65 ($\times 10^{-6}$/° C.). The material of the restricting member 310 is poly ether ether ketone (PEEK), and its linear expansion coefficient A1 is 26 ($\times 10^{-6}$/° C.).

Further, the thickness U0 of the polygon mirror 308 is considered in the environmental temperature of 25° C. as normal temperature with the motor 301 stopped. At this time, the pressed portion 308e1 provided on the upper surface 308e of the polygon mirror 308 pressed by the pressing portion 309d of the holding spring 309 is considered. Furthermore, the abutting portion 308f1 provided on the lower surface 308f that abuts against the abutted portion 302a on the upper surface of the rotor 302 is considered. The thickness U0 in the axial direction (vertical direction in FIG. 5) of the shaft 305 from the pressed portion 308e1 to the abutting portion 308f1 of the polygon mirror 308 is 10 mm.

Further, the thickness X0 of the restricting member 310 is considered in the environmental temperature of 25° C. as normal temperature in the state where the motor 301 is stopped. At this time, the pressed portion 310a1 provided on the upper surface 310a of the restricting member 310 pressed by the pressing portion 309b of the holding spring 309 is considered. Furthermore, the pressing portion 310b1 provided on the lower surface 310b of the restricting member 310 that abuts against the abutted portion 302b provided on the upper surface of the rotor 302 is considered. The thickness X0 of the restricting member 310 in the axial direction (vertical direction in FIG. 5) of the shaft 305 from the pressed portion 310a1 to the pressing portion 310b1 of the restricting member 310 is 8 mm.

Next, the state in which the heat generated by the rotation of the motor 301 is transmitted to the polygon mirror 308 and the restricting member 310 through the rotor 302 after the polygon motor unit 300 operates, and the polygon mirror 308 and the restricting member 310 are thermally expanded will be described. The heat is generated from the parts of the motor 301 when the motor 301 rotates. For example, the heat is generated from the exciting coil 304 due to copper loss and iron loss caused by an electric current flow.

The heat is generated from the bearing 306 due to the friction between the bearing 306 and the shaft 305. This heat is transmitted to the polygon mirror 308 and the restricting member 310 through the rotor 302. In such a configuration, the influence when the rotation of the motor 301 continues and the temperature of the polygon mirror 308 and the restricting member 310 reaches 80° C. will be considered.

The temperature change ΔT occurs from 25° C. as normal temperature in the assembly process of the polygon motor unit 300 to 80° C. due to the heat generated by the motor 301. Therefore, the polygon mirror 308 and the restricting member 310 thermally expands due to the temperature change ΔT calculated by the following Equation 5.

$$\Delta T = 80°\,C. - 25°\,C. = 55°\,C. \quad \text{[Equation 5]}$$

Here, the thickness U2 of the polygon mirror 308 that changes due to the temperature change ΔT expressed by the above Equation 5 is considered. At this time, the pressed portion 308e1 of the upper surface 308e of the polygon mirror 308 that is pressed by the pressing portion 309d of the holding spring 309 is considered. Further, the abutting portion 308f1 of the lower surface 308f of the polygon mirror 308 that abuts against the abutted portion 302a of the rotor 302 is considered. The thickness U2 of the polygon mirror 308 is from the pressed portion 308e1 to the abutting portion 308f1 in the axial direction (vertical direction in FIG. 5) of the shaft 305.

The thickness U2 of the polygon mirror 308 that changes with the temperature change ΔT shown in the above Equation 5 is considered. Here, it is considered that the thickness U0 of the polygon mirror 308 in the environmental temperature of 25° C. as normal temperature is 10 mm. Further, it is considered that the temperature change ΔT is 55° C. (=80° C.−25° C.). Further, it is considered that the linear expansion coefficient B1 of the polygon mirror 308 made of polycarbonate (PC) is 65 (×10$^{-6}$/° C.). Using these factors, the thickness U2 of the polygon mirror 308 is calculated by the following Equation 6.

$$\begin{aligned} U2 &= U0 + (U0 \times \Delta T \times B1) \quad \text{[Equation 6]}\\ &= 10\,\text{mm} + (10\,\text{mm} \times 55°\,C. \times 65 \times 10^{-6}/°\,C.)\\ &= 10.03575\,\text{mm} \end{aligned}$$

In addition, the thickness X0 of the restricting member 310 in the environmental temperature of 25° C. as normal temperature is considered. At this time, the pressed portion 310a1 of the upper surface 310a of the restricting member 310 pressed by the pressing portion 309b of the holding spring 309 is considered. Further, the pressing portion 310b1 on the lower surface 310b of the restricting member 310 that abuts against the abutted portion 302b of the rotor 302 is considered. The thickness X0 of the restricting member 310 is from the pressed portion 310a1 to the pressing portion 310b1 in the axial direction (vertical direction in FIG. 5) of the shaft 305.

The thickness X2 of the restricting member 310 that changes due to the temperature change ΔT expressed by the above Equation 5. At this time, it is considered that the thickness X0 of the restricting member 310 in the environmental temperature of 25° C. as normal temperature is 8 mm. Further, it is considered that the temperature change ΔT is 55° C. (=80° C.−25° C.). Further, it is considered that the linear expansion coefficient A1 of the restricting member 310 made of poly ether ether ketone (PEEK) is 26 (×10$^{-6}$/° C.). Using these factors, the thickness X2 of the restricting member 310 is calculated by the following Equation 7.

$$\begin{aligned} X2 &= X0 + (X0 \times \Delta T \times A1) \quad \text{[Equation 7]}\\ &= 8\,\text{mm} + (8\,\text{mm} \times 55°\,C. \times 26 \times 10^{-6}/°\,C.)\\ &= 8.01144\,\text{mm} \end{aligned}$$

The above Equation 6 and Equation 7 are compared. At this time, the difference between the change in thickness (0.03575 mm) due to the thermal expansion of the polygon mirror 308 and the change in thickness (=0.01144 mm) due to the thermal expansion of the restricting member 310 in the case where the temperature rises from 25° C. as normal temperature to 80° C. At that time, the difference between the change in the thickness due to thermal expansion of the polygon mirror 308 and the change in the thickness due to thermal expansion of the restricting member 310 is 24.31 μm (=35.75 μm−11.44 μm). Accordingly, it is found that the change in the thickness due to the thermal expansion of the polygon mirror 308 is greater than the change in the thickness due to the thermal expansion of the restricting member 310.

Next, the change in the spring pressure of the holding spring 309 due to the thermal expansion and the influence thereof will be described with reference to FIG. 5. The dotted line in FIG. 5 indicates the holding spring 309 at 25° C. as normal temperature. On the other hand, the solid line in FIG. 5 indicates the holding spring 309 affected by the thermal expansion of the polygon mirror 308 and the restricting member 310 at 80° C. The upper-end portion 309a1 of the cylindrical portion 309a abuts against the bottom surface 305a1 of the head portion 305a of the shaft 305 so that the holding spring 309 is restricted from moving upward.

As shown in FIG. 4, the holding spring 309 is deformed in a region from the pressing portion 309b that presses the restricting member 310 to the pressing portions 309d that presses the polygon mirror 308 about the arm portions 309c with a width narrower than the width of the rectangular pressing portions 309d. The polygon mirror 308 is pressed against the rotor 302 and fixed by the holding spring 309 with the deformation stress of the arm portions 309c.

In this configuration, as indicated in the Equation 6, the thickness of the polygon mirror 308 increases by 35.75 μm due to the thermal expansion of the polygon mirror 308 and the restricting member 310 when the environmental temperature changes from 25° C. as normal temperature to 80° C. Similarly, the thickness of the restricting member 310 increases by 11.44 μm as indicated in the above Equation 7. Accordingly, the holding spring 309 when the environmental temperature is 25° C. as normal temperature as indicated by the dotted line in FIG. 5 is deformed as indicated by the solid line in FIG. 5 when the environmental temperature is 80° C.

Here, the curvature radius R of the pressing portion 309b shown in FIG. 5 is considered as the degree of deformation of the holding spring 309 that presses the restricting member 310. At this time, the radius of curvature R of the pressing portion 309b when the environmental temperature rises to 80° C. as indicated by the solid line in FIG. 5 is less than the radius of curvature R of the pressing portion 309b when the environmental temperature is 25° C. as normal temperature as indicated by the dotted line in FIG. 5.

Therefore, the pressing force for pressing the polygon mirror 308 by the pressing portions 309d of the holding spring 309 indicated by the solid line in FIG. 5 in the case where the environmental temperature rises to 80° C. is greater than that in the case where the environmental temperature is 25° C. as normal temperature. Accordingly, a positional shift with respect to the rotor 302 does not occur in the polygon mirror 308 pressed by the pressing portions 309d of the holding spring 309 indicated by the solid line in FIG. 5 when the environmental temperature rises to 80° C.

Figure 6:
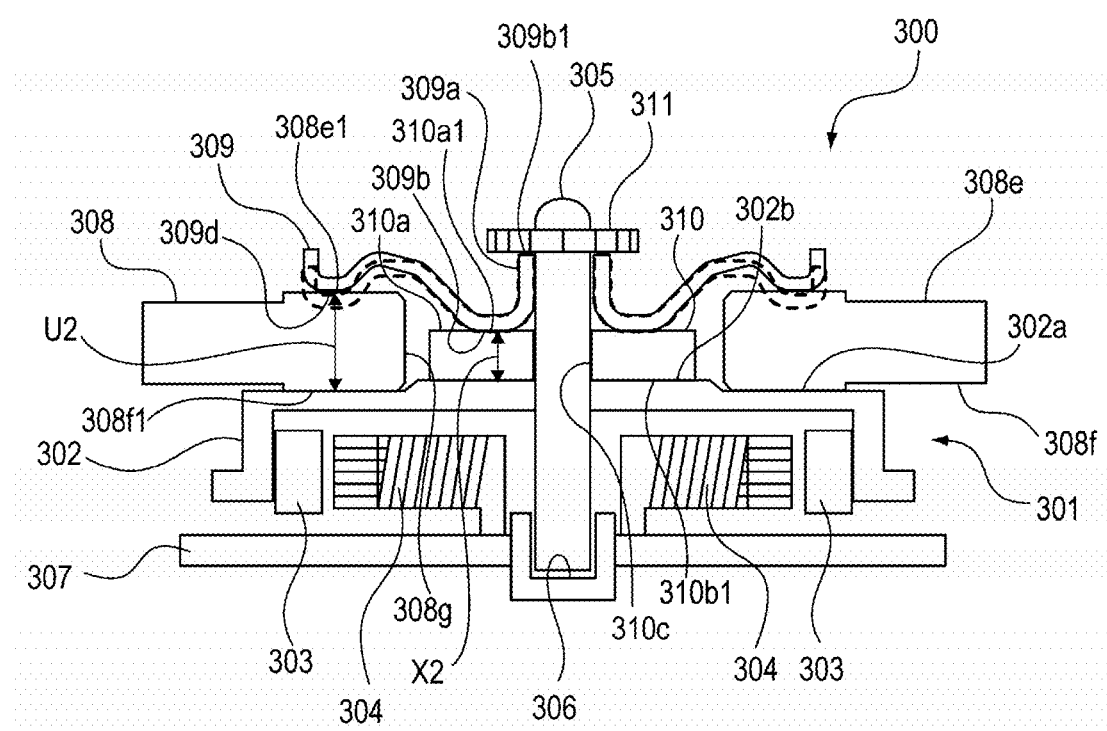
FIG. 6 is a plan view showing a modification example of a configuration of a polygon motor unit of the first embodiment.

<Modifications> Next, the configuration of a modified example of the polygon motor unit 300 according to the first embodiment will be described with reference to FIG. 6. FIG. 6 is a cross-sectional view showing the configuration of the modified example of the polygon motor unit 300 of the first embodiment. In the above embodiment, an example of the configuration in which the holding spring 309 is restricted by the head portion 305a of the shaft 305 from moving toward the side opposite to the rotor 302 has been described.

In the modified example shown in FIG. 6, as the configuration that the holding spring 309 is restricted from moving toward the opposite side of the rotor 302, the holding spring 309 is configured to be restricted from moving toward the opposite side of the rotor 302 by the holding ring 311 as a member separate from the shaft 305. The shaft 305 shown in FIG. 6 is not provided with a member such as the head portion 305a as shown in FIG. 5. The shaft 305 is integrated with the rotor 302, and the shaft 305 is rotatably supported by the bearing 306.

The holding ring 311 that is engaged to the outer circumferential surface of the shaft 305 is provided as a restricting member that restricts the holding spring 309 from moving toward the side opposite to the rotor 302. The holding ring 311 is press-engaged into the outer circumferential surface of the shaft 305 at such a position that the pressing portions 309d of the holding spring 309 applies a predetermined pressing force to the polygon mirror 308.

The holding ring 311 exhibits the same effect as the head portion 305a of the shaft 305 shown in FIG. 5. For this reason, the same effect can be obtained also in the configuration in which the holding ring 311 as another member engaged to the outer circumferential surface of the shaft 305 is provided. In addition, the holding ring 311 is configured to press-engaged to the outer circumferential surface of the shaft 305 and to restrict the movement of the holding spring 309 toward the side opposite to the rotor 302. In addition, by using an E-ring with E-shape as the holding ring 311 and providing a recess for mounting the E-ring on the outer circumferential surface of the shaft 305, the E-ring may be mounted on the recess provided on the outer circumferential surface of the shaft 305 in order to restrict the holding spring 309 from moving toward the side opposite to the rotor 302.

Further, the cylindrical portion 309a of the holding spring 309 may be configured to have a sufficient pressing force on the outer circumferential surface of the shaft 305 toward the radially inner side of the shaft 305 and to restrict the movement of the holding spring 309 toward the side opposite to the rotor 302. In this case, restricting members such as the head portion 305a of the shaft 305 and the holding ring 311 are unnecessary.

In the present embodiment, the materials of the restricting member 310 are described as poly ether ether ketone (PEEK). However, these materials may be selected such that the linear expansion coefficient A of the restricting member 310 is less than or equal to half the linear expansion coefficient B of the polygon mirror 308. Therefore, the material of the restricting member 310 is not limited to poly ether ether ketone (PEEK).

For example, liquid crystal polymer resin (LCP) having a linear expansion coefficient A of 20 ($\times 10^{-6}/°$ C.) may be used as the material of the restricting member 310. In addition, poly amide imide (PAI) having a linear expansion coefficient A of 30.6 ($\times 10^{-6}/°$ C.) may also be used.

Thus, by appropriately selecting the materials such that the linear expansion coefficient A of the restricting member 310 is less than the linear expansion coefficient B of the polygon mirror 308, and the linear expansion coefficient A of the restricting member 310 is half or less than half of the linear expansion coefficient B of the polygon mirror 308, it is possible to restrict the holding spring 309 from moving toward the rotor 302 and to reduce the displacement of the polygon mirror 308. As a result, it is possible to suppress the positional deviation of the polygon mirror 308 due to the temperature change ΔT of the polygon motor unit 300 that generates heat as the motor 301 rotates, and to suppress the positional fluctuations of the reflecting surfaces 308a to 308d of the polygon mirror 308 due to the positional deviation.

Accordingly, it is possible to reduce the deformation of the holding spring 309 due to the thermal expansion of the polygon mirror 308 and the restricting member 310 which occurs when the heat generated from the motor 301 is transferred to the polygon mirror 308 and the restricting member 310. As a result, it is possible to suppress the occurrence of the positional deviation of the polygon mirror 308 and the positional fluctuation of the reflecting surfaces 308a to 308d of the polygon mirror 308 due to a temperature change.

Second Embodiment

Next, the configuration of the second embodiment of the optical scanning device according to the present invention will be described with reference to FIGS. 8 and 9. In addition, a member that is the same as or similar to that of the first embodiment is attached to the same reference numeral and the description thereof is omitted. In the first embodiment, the holding spring 309 is restricted from moving toward the rotor 302 by the restricting member 310. Accordingly, the positional deviation of the polygon mirror 308 is reduced. As a result, a decrease in the pressing force of the holding spring 309 due to thermal expansion of the polygon mirror 308 and the restricting member 310 is suppressed and a positional deviation of the polygon mirror 308 is suppressed.

In the first embodiment, the positional deviation of the polygon mirror 308 is suppressed by increasing the pressing force of the holding spring 309 due to the thermal expansion of the polygon mirror 308 and the restricting member 310. However, when the pressing force of the holding spring 309 increases excessively, the pressing force applied to the polygon mirror 308 becomes excessively large. As a result, the reflecting surfaces 308a to 308d of the polygon mirror 308 are distorted, and the reflection position of the laser beam L incident on each of the reflecting surfaces 308a to 308d varies, thereby causing an image defect.

Figure 7A:
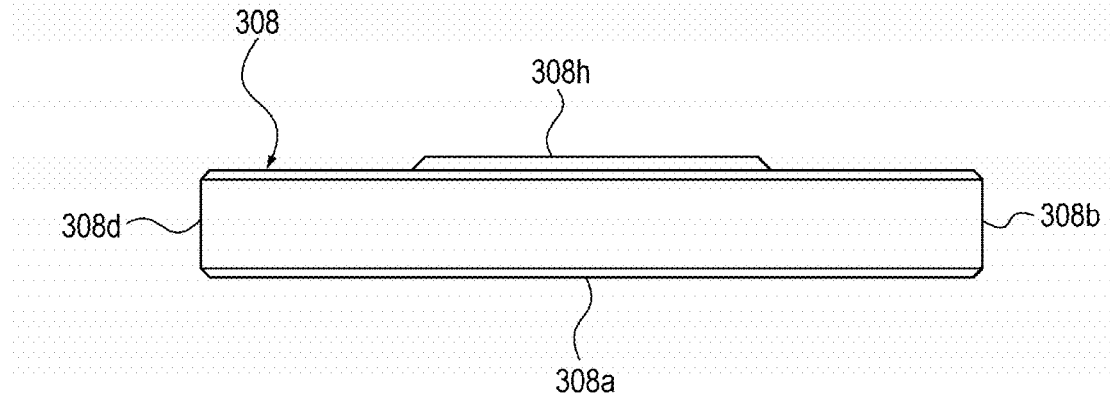
FIG. 7A is a side view of the polygon mirror in a state where the polygon mirror is not affected by thermal expansion.
Figure 7B:
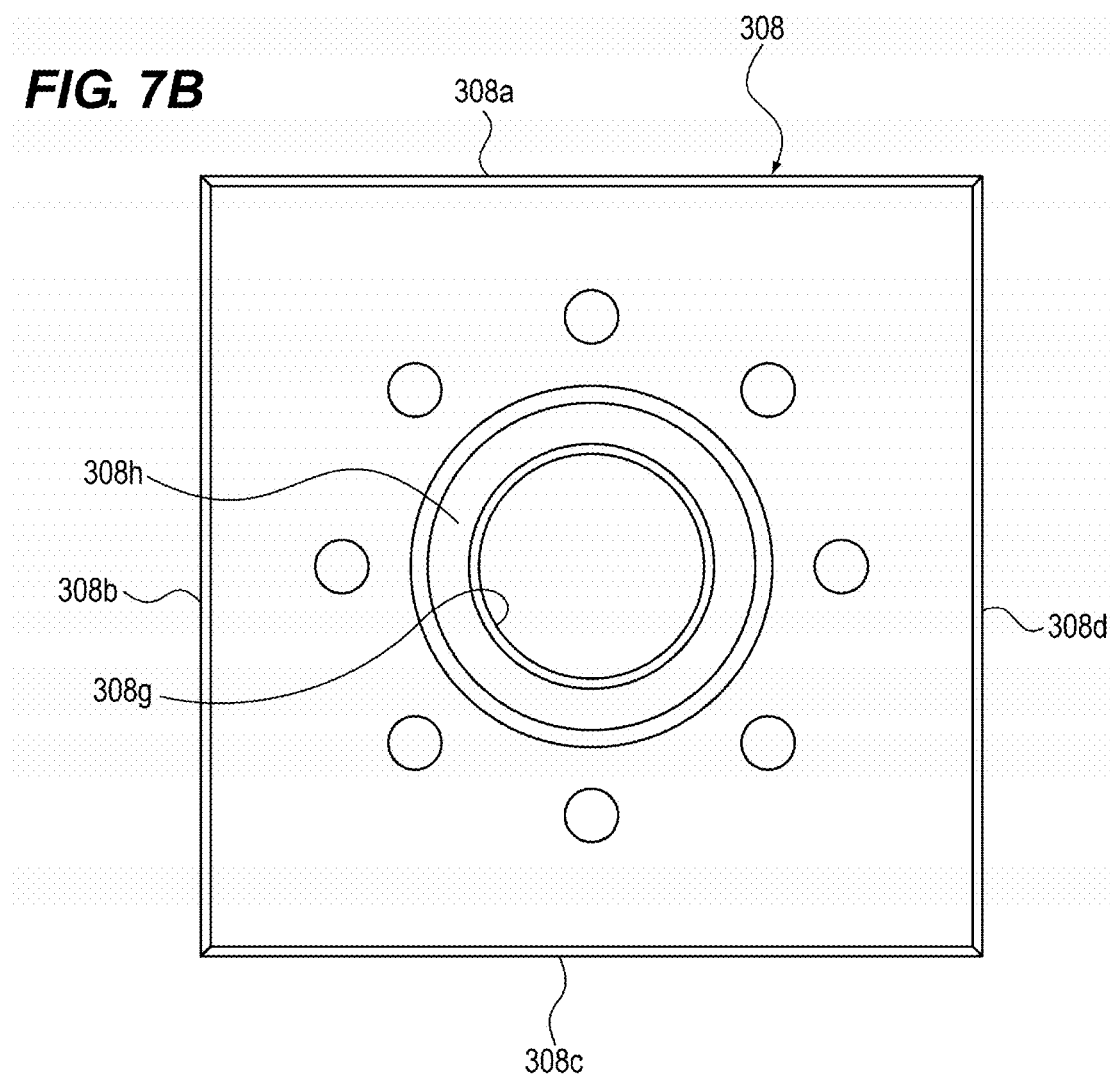
FIG. 7B is a plan view of the polygon mirror in a state where the polygon mirror is not affected by thermal expansion.
Figure 8A:
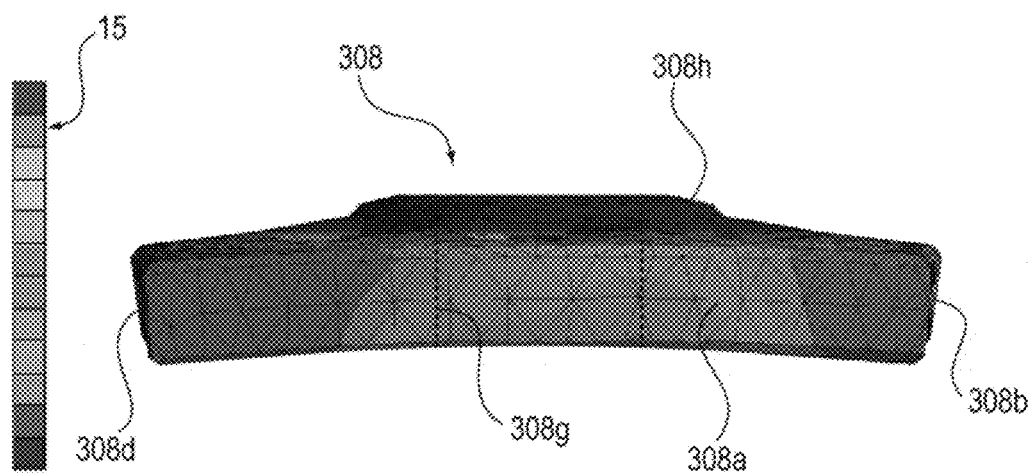
FIG. 8A is a side view of the polygon mirror in a state where the polygon mirror is affected by thermal expansion.
Figure 8B:
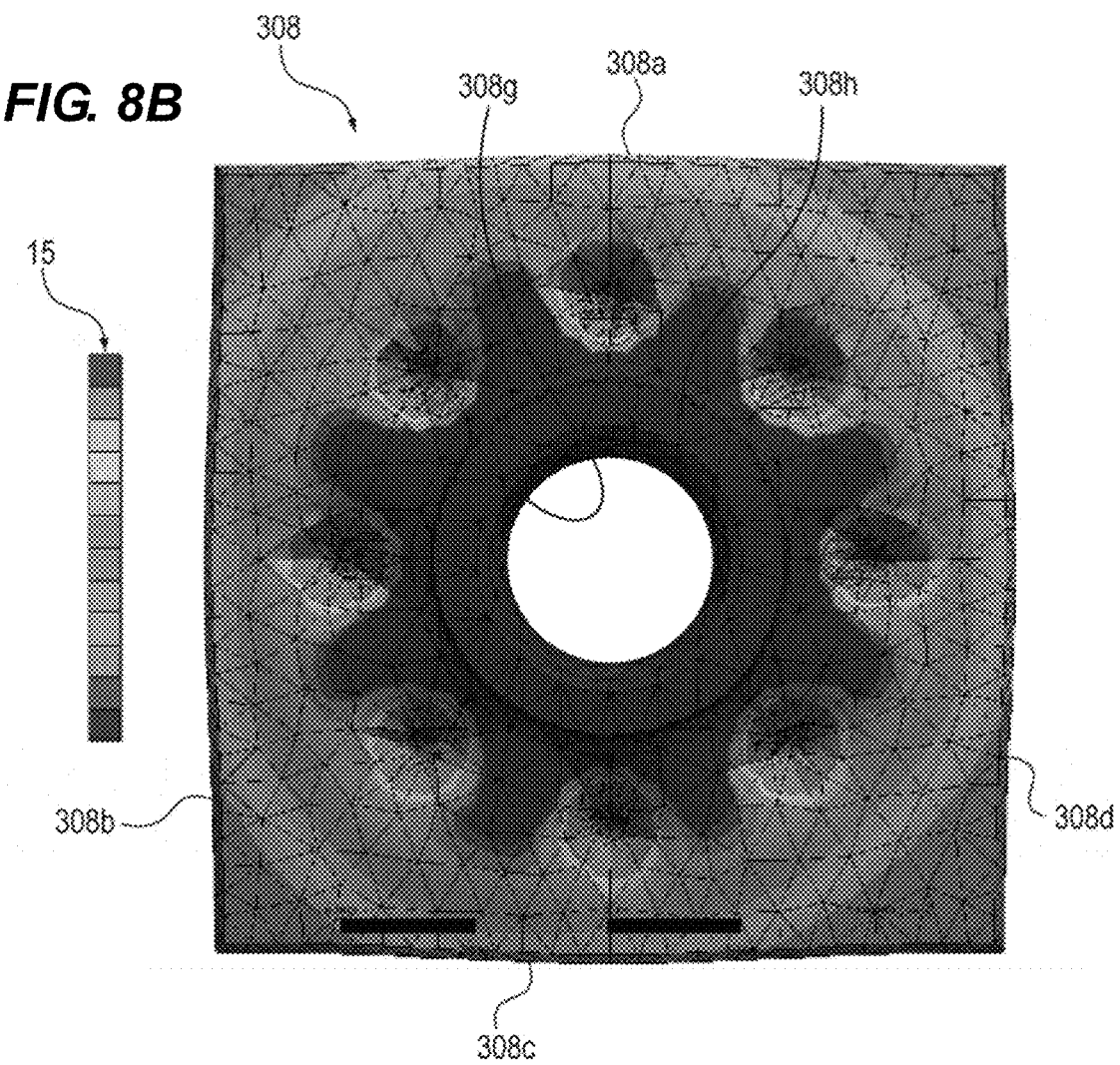
FIG. 8B is a plan view of the polygon mirror in a state where the polygon mirror is affected by thermal expansion.

<Deformation of polygon mirror by increasing pressure>
Next, the manner in which the polygon mirror 308 is deformed when the pressing force of the holding spring 309 increases excessively will be described with reference to FIGS. 7A, 7B, 8A, 8B and 9. FIG. 7A is a side view of the polygon mirror 308 that is not affected by thermal expansion. FIG. 7B is a plan view of the polygon mirror 308 that is not affected by thermal expansion. FIG. 8A is a side view of the polygon mirror 308 that is affected by thermal expansion. FIG. 8B is a plan view of the polygon mirror 308 that is affected by thermal expansion. FIG. 9 is a cross-sectional view showing a configuration of the polygon motor unit 300 of the present embodiment.

As shown in FIGS. 7A and 7B, the reflecting surfaces 308a to 308d of the polygon mirror 308 have an angle with the desired accuracy in a state where they are not affected by thermal expansion so that the laser beam L may be correctly reflected and transmitted to the sub-scanning position on the surface of the drum 102. FIG. 8A is a side view showing a state in which the pressing force from the holding spring 309 is excessively increased under the influence of thermal expansion and the polygon mirror 308 is deformed. FIG. 8B is a plan view showing a state in which the pressing force from the holding spring 309 is excessively increased under the influence of thermal expansion and the polygon mirror 308 is deformed.

In the color chart 15 shown on the left side of FIGS. 8A and 8B, a warmer color is used as it goes upward and a colder color is used as it goes downward. In the color chart 15, a warmer color means greater deformation of the polygon mirror 308 and a colder color means less deformation of the polygon mirror 308. The peripheral portion 308h of the through-hole 308g provided at the center of the polygon mirror 308 shown in FIGS. 8A and 8B is represented in the coldest color in the color chart 15. This shows that the deformation is the smallest in the peripheral portion 308h of the through-hole 308g of the polygon mirror 308. In addition, it is shown that the deformation of the polygon mirror 308 is large at the end portions of the reflecting surfaces 308a to 308d of the polygon mirror 308.

As shown in FIGS. 8A and 8B, the reflecting surfaces 308a to 308d of the polygon mirror 308 are distorted due to an excessive increase in the pressing force from the holding spring 309 under the influence of thermal expansion. Accordingly, the reflection position of the laser beam L on the reflecting surfaces 308a to 308d of the polygon mirror 308 changes so that the density in the positions of the laser beam L incident on the photosensitive drum 102 varies, thereby causing an occurrence of density unevenness in the sub-scanning direction.

Figure 9:
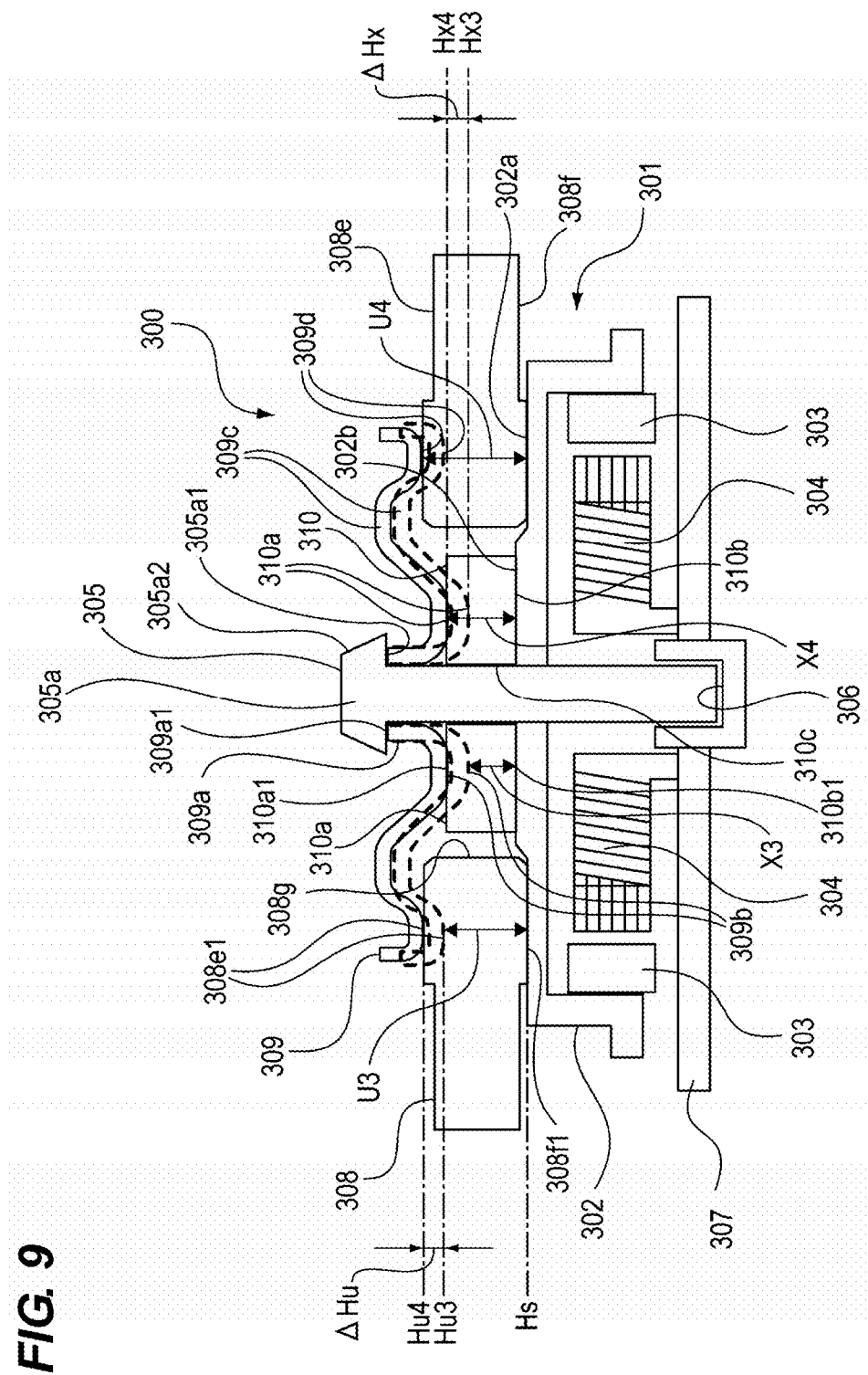
FIG. 9 is a cross-sectional view illustrating a configuration of the polygon motor unit of the second embodiment.

Here, the case where the polygon mirror 308 and the restricting member 310 are deformed due to thermal expansion is considered with reference to FIG. 9. The height position Hu3 of the upper surface 308e of the polygon mirror 308 when the thickness of the polygon mirror 308 is U3 in a state where the motor 301 is stopped in the environmental temperature of 25° C. as normal temperature is considered. Further, the height position Hu4 of the upper surface 308e of the polygon mirror 308 when the thickness of the polygon mirror 308 is U4 in a state where the temperature rises to 80° C. due to the heat generated by the motor 301 is considered. Then, the relative height difference ΔHu between the height position Hu3 and the height position Hu4 of the upper surface 308e of the polygon mirror 308 when the temperature changes from 25° C. to 80° C. is considered.

On the other hand, the height position Hx3 of the upper surface 310a of the restricting member 310 when the thickness of the restricting member 310 is X3 in a state where the motor 301 is stopped in the environmental temperature of 25° C. as normal temperature is considered. Further, the height position Hx4 of the upper surface 310a of the restricting member 310 when the thickness of the restricting member 310 is X4 in a state where the environmental temperature rises to 80° C. due to the heat generated by the motor 301 is considered.

Then, the relative height difference ΔHx between the height position Hx3 and the height position Hx4 of the upper surface 310a of the restricting member 310 when the temperature changes from 25° C. to 80° C. is considered. In the present embodiment, the height difference ΔHu of the upper surface 308e of the polygon mirror 308 and the height difference ΔHx of the upper surface 310a of the restricting member 310 when the temperature changes from 25° C. to 80° C. are kept substantially the same. This suppresses the holding spring 309 from applying an excessive pressing force to the polygon mirror 308.

Figure 10:
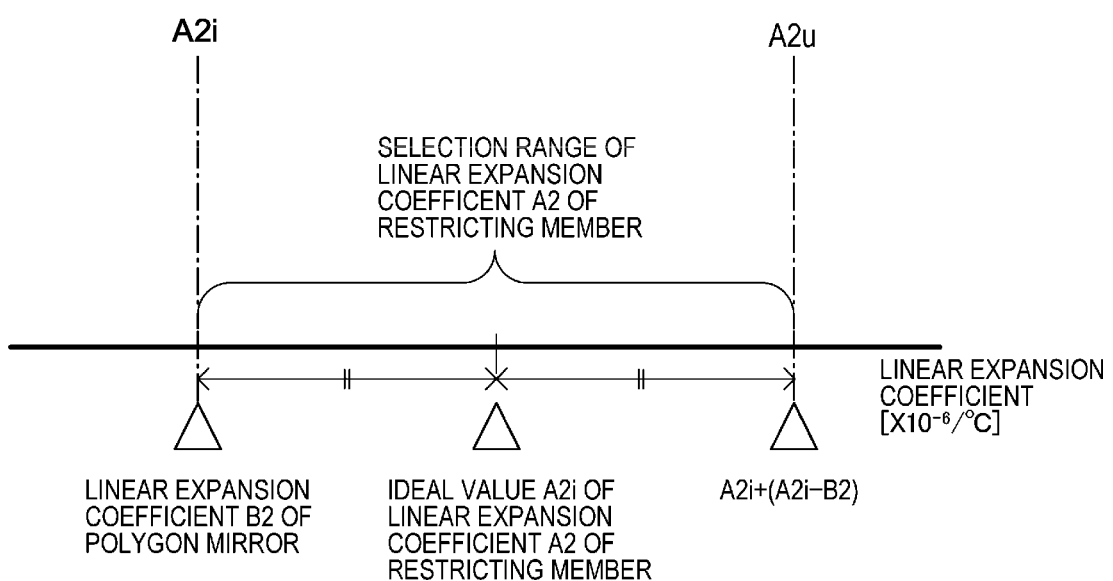
FIG. 10 is a view for explaining the selection range of the linear expansion coefficient of the restricting member and the linear expansion coefficient of the polygon mirror according to the second embodiment.

<Selection of materials for polygon mirror and restricting member> Next, a method for selecting materials for the polygon mirror 308 and the restricting member 310 of the polygon motor unit 300 in this embodiment will be described with reference to FIG. 10. FIG. 10 is a diagram illustrating a selection range of the linear expansion coefficient A2 of the restricting member 310 and the linear expansion coefficient B2 of the polygon mirror 308 according to the present embodiment. Also in this embodiment, the linear expansion coefficient A2 of the restricting member 310 is selected within a predetermined range based on the linear expansion coefficient B2 of the polygon mirror 308.

As shown in FIG. 10, the material of the polygon mirror 308 in this embodiment is polycarbonate (PC) and its linear expansion coefficient B2 is 65 ($\times 10^{-6}$/° C.).

Here, a state where the motor 301 is stopped in the environmental temperature of 25° C. as normal temperature is considered. At this time, the thickness U3 of the polygon mirror 308 shown in FIG. 9 is 10 mm. Here, the pressed portion 308e1 of the upper surface 308e of the polygon mirror 308 that is pressed by the pressing portion 309d of the holding spring 309 is considered. Further, the abutting portion 308f1 of the lower surface 308f of the polygon mirror 308 that abuts against the abutted portion 302a of the upper surface of the rotor 302 is considered. At this time, the thickness of the polygon mirror 308 from the pressed portion 308e1 to the abutting portion 308f1 in the axial direction of the shaft 305 (vertical direction in FIG. 9) is U3.

Further, a state where the motor 301 is stopped in the environment temperature of 25° C. as normal temperature is considered. At this time, the thickness X3 of the restricting member 310 is 8 mm. Here, the pressed portion 310a1 of the upper surface 310a of the restricting member 310 pressed by the pressing portion 309b of the holding spring 309 is considered. Furthermore, the pressing portion 310b1 on the lower surface 310b of the restricting member 310 that abuts against the abutted portion 302b on the upper surface of the rotor 302 is considered. The thickness of the restricting member 310 from the pressed portion 310a1 to the pressing portion 310b1 in the axial direction of the shaft 305 (the vertical direction in FIG. 5) is X3.

At this time, the linear expansion coefficient B2 of the polygon mirror 308 made of polycarbonate is considered. Furthermore, in the environmental temperature of 25° C. as normal temperature, the thickness U3 at normal temperature in a direction perpendicular to the abutted portion 302a of the rotor 302 as a surface with which the polygon mirror 308 is in contact (vertical direction in FIG. 9) is considered. Further, in the environmental temperature of 25° C. as normal temperature, the thickness X3 of the restricting member 310 at normal temperature in a direction perpendicular to the abutted portion 302b of the rotor 302 as a surface with which the restricting member 310 is in contact (vertical direction in FIG. 9) is considered.

Using these factors, the ideal value A2i of the linear expansion coefficient A2 the material of the restricting member 310 has is obtained by the following Equation 8. The thickness U3 of the polygon mirror 308 in normal temperature and the thickness X3 of the restricting member 310 in normal temperature are those in the room temperature of 25° C. as normal temperature at which the polygon motor unit 300 is assembled. The normal temperature at this time can be in the range of 20° C. to 35° C.

$$A2i = (B2 \times U3)/X3 \quad \text{[Equation 8]}$$
$$= (65 \times 10^{-6}/°\text{C.} \times 10 \text{ mm})/8 \text{ mm}$$
$$= 81.25(\times 10^{-6}/°\text{C.})$$

At this time, polycarbonate/ABS having a linear expansion coefficient $A2$ of 81.25 ($\times$10-6/° C.) can be selected as the material of the restricting member 310. Here, polycarbonate/ABS is a mixture of polycarbonate (PC) and ABS. ABS is a copolymer of acrylonitrile, butadiene and styrene.

Here, the ideal value $A2i$ of the linear expansion coefficient $A2$ of the material of the restricting member 310 is considered. The linear expansion coefficient $B2$ of the polygon mirror 308 is considered for the ideal value $A2i$ as shown in the above Equation 8. Furthermore, the thickness $U3$ of the polygon mirror 308 in the environmental temperature of 25° C. as normal temperature is considered. Then, the ideal value $A2i$ is obtained by the ratio of the product of the linear expansion coefficient $B2$ of the polygon mirror 308 and the thickness $U3$ of the polygon mirror 308 to the thickness $X3$ of the restricting member 310 in the environmental temperature of 25° C. as normal temperature.

The case where the heat generated by the motor 301 is applied to the polygon mirror 308 and the restricting member 310 through the rotor 302 is considered. At this time, the height position $Hu4$ of the pressed portion 308e1 of the upper surface 308e of the polygon mirror 308 pressed by the pressing portion 309d of the holding spring 309 is considered. Further, the height position $Hx4$ of the pressed portion 310a1 of the upper surface 310a of the restricting member 310 pressed by the pressing portion 309b of the holding spring 309 is considered. At this time, the relative height difference $\Delta H$ between the height positions $Hu4$ and $Hx4$ remains unchanged.

The height positions $Hu3$, $Hu4$, $Hx3$ and $Hx4$ shown in FIG. 9 can be heights measured from the reference height $Hs$ that is the height of the surface of the abutted portion 302b of the rotor 302. Another common reference height for comparing the height positions $Hu3$, $Hu4$, $Hx3$ and $Hx4$ of the pressed portion 308e1 of the upper surface 308e of the polygon mirror 308 and the pressed portion 310a1 of the upper surface 310a of the restricting member 310 can be adopted instead of the common reference height $Hs$.

<Change in spring pressure of holding spring due to thermal expansion and its influence> Next, a change in the spring pressure of the holding spring 309 due to thermal expansion of the polygon mirror 308 and the restricting member 310 and its influence will be described with reference to FIG. 9.

FIG. 9 shows the relative height difference $\Delta Hu$ between the height positions $Hu3$ and $Hu4$ of the pressed portion 308e1 of the upper surface 308e of the polygon mirror 308 due to thermal expansion, and the relative height difference $\Delta Hx$ between the height positions $Hx3$ and $Hx4$ of the pressed portion 310a1 of the upper surface 310a of the restricting member 310. As shown in FIG. 9, the relative height difference $\Delta Hu$ between the height positions $Hu3$ and $Hu4$ of the pressed portion 308e1 on the upper surface 308e of the polygon mirror 308 due to thermal expansion is considered. The relative height difference $\Delta Hx$ of the height positions $Hx3$ and $Hx4$ of the pressed portion 310a1 of the upper surface 310a of the restricting member 310 due to thermal expansion becomes the same as the height difference $\Delta Hu$.

At this time, the arm portions 309c from the pressing portion 309b that abuts against the pressed portion 310a1 of the upper surface 310a of the restricting member 310 of the holding spring 309 to the pressing portions 309d that abuts against the pressed portion 308e1 of the upper surface 308e of the polygon mirror 308 are considered. As shown in FIG. 9, the arm portions 309c are not displaced by thermal expansion. For this reason, it is possible to reduce the change in the pressing force applied to the polygon mirror 308 by the pressing portion 309d of the holding spring 309. As a result, it is possible to prevent the positional deviation of the polygon mirror 308 and an excessive increase in pressing force on the polygon mirror 308.

<Selection range of linear expansion coefficient of restricting member when ideal value cannot be selected> Next, the selection range of the linear expansion coefficient $A2$ of the restricting member 310 in the case where the ideal value $A2i$ of the linear expansion coefficient $A2$ of the material of the restricting member 310 cannot be selected due to restrictions on the materials of the polygon mirror 308 and the restricting member 310 will be described referring to FIG. 10. As shown in FIG. 10, the ideal value $A2i$ of the linear expansion coefficient $A2$ of the material of the restricting member 310 is considered as a center.

The upper limit value $A2u$ of the linear expansion coefficient $A2$ of the material of the restricting member 310 is defined as a value obtained by adding the difference between the linear expansion coefficient $B2$ of the polygon mirror 308 and the ideal value $A2i$ to the ideal value $A2i$. Further, the lower limit value $A2i$ of the linear expansion coefficient $A2$ of the material of the restricting member 310 is defined as the linear expansion coefficient $B2$ of the polygon mirror 308. Then, the linear expansion coefficient $A2$ of the material of the restricting member 310 is selected in the range from the lower limit value $A2i$ to the upper limit value $A2u$.

Due to restrictions on the materials of the polygon mirror 308 and the restricting member 310, the ideal value $A2i$ of the linear expansion coefficient $A2$ of the material of the restricting member 310 may not be selected. In this case, the linear expansion coefficient $A2$ of the restricting member 310 can be selected in the range expressed by the following Equation 9 using the linear expansion coefficient $B2$ of the polygon mirror 308 and the ideal value $A2i$ of the linear expansion coefficient $A2$ of the material of the restricting member 310.

$$B2 \leq A2 \leq A2i+(A2i-B2) \quad \text{[Equation 9]}$$

In the present embodiment, the case where polycarbonate/ABS is used as the material of the restricting member 310 has been described. In addition, as the material of the restricting member 310, polypropylene (PP) having a linear expansion coefficient $A2$ of 90 ($\times 10^{-6}/°$ C.) can be used. Further, polyoxymethylene (POM) having a linear expansion coefficient $A2$ of 85 ($\times 10^{-6}/°$ C.) may be used. As the polyoxymethylene, DURACON (registered trademark) manufactured by Polyplastics Co., Ltd. can be used.

As shown in Equation 8, the linear expansion coefficient $B$ of the polygon mirror 308, the thickness $U3$ of the polygon mirror 308 in the environmental temperature of 25° C. as normal temperature and the thickness $X3$ of the restricting member 310 in the environmental temperature of 25° C. as normal temperature are considered. Using these factors, the ideal value $A2i$ of the linear expansion coefficient $A2$ of the material of the restricting member 310 is obtained. Then, the material of the restricting member 310 is appropriately selected within the range expressed by the above Equation 9.

Accordingly, the pressing force applied by the holding spring 309 to the polygon mirror 308 can be controlled within a predetermined range. As a result, it is possible to suppress the positional deviation of the polygon mirror 308 and the deformation of the reflecting surfaces 308a to 308d of the polygon mirror 308. Other configurations are the same as those in the first embodiment, and the same effects can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-208562, filed Nov. 6, 2018, which is hereby incorporated by reference herein in its entirety.

What is claimed is:

1. An optical scanning device, comprising:
a motor including a rotor capable of rotating integrally with a rotating shaft;
a polygon mirror including a through-hole;
a spring configured to be engaged to the rotating shaft that is inserted into the through-hole and configured to press the polygon mirror onto the rotor; and
a restricting member disposed in the through-hole of the polygon mirror, the restricting member being configured to be in contact with the rotor and the spring and to restrict the spring from moving toward a side of the rotor,
wherein a linear expansion coefficient of the restricting member is less than a linear expansion coefficient of the polygon mirror.

2. The optical scanning device according to claim 1, wherein the linear expansion coefficient of the restricting member and the linear expansion coefficient of the polygon mirror are such that:

$$A \leq 0.5 \times B,$$

where A represents the linear expansion coefficient of the restricting member and B represents the linear expansion coefficient of the polygon mirror.

3. An optical scanning device, comprising:
a motor including a rotor capable of rotating integrally with a rotating shaft;
a polygon mirror including a through-hole;
a spring configured to be engaged to the rotating shaft that is inserted into the through-hole and configured to press the polygon mirror onto the rotor; and
a restricting member disposed in the through-hole of the polygon mirror, the restricting member being configured to be in contact with the rotor and the spring and to restrict the spring from moving toward a side of the rotor,
wherein a linear expansion coefficient of the restricting member is selected in a predetermined range based on a linear expansion coefficient of the polygon mirror.

4. The optical scanning device according to claim 3, wherein an equation $A=(B \times U0)/X0$ is satisfied,
where A represents the linear expansion coefficient of the restricting member, B represents the linear expansion coefficient of the polygon mirror, U0 represents a thickness of the polygon mirror at a normal temperature in a direction perpendicular to a surface of the polygon mirror with which said surface the rotor is in contact, and X0 represents a thickness of the restricting member at a normal temperature in a direction perpendicular to a surface of the restricting member with which said surface the rotor is in contact.

5. The optical scanning device according to claim 3, wherein an equation $Ai=(B \times U0)/X0$ is satisfied and the linear expansion coefficient of the restricting member is such that:

$$B \leq A \leq Ai+(Ai-B),$$

where Ai represents an ideal value of the linear expansion coefficient of the restricting member, B represents the linear expansion coefficient of the polygon mirror, U0 represents a thickness of the polygon mirror at a normal temperature in a direction perpendicular to a surface of the polygon mirror with which said surface the rotor is in contact, X0 represents a thickness of the restricting member at a normal temperature in a direction perpendicular to a surface of the restricting member with which said surface the rotor is in contact, and A represents the linear expansion coefficient of the restricting member.

* * * * *